(12) United States Patent
Horn et al.

(10) Patent No.: US 8,376,233 B2
(45) Date of Patent: Feb. 19, 2013

(54) BAR CODE SYMBOL READING SYSTEM EMPLOYING AN EXTREMELY ELONGATED LASER SCANNING BEAM CAPABLE OF READING POOR AND DAMAGED QUALITY BAR CODE SYMBOLS WITH IMPROVED LEVELS OF PERFORMANCE

(75) Inventors: Erik Van Horn, Ocean View, NJ (US); Patrick Anthony Giordano, Glassboro, NJ (US); Thomas Amundsen, Turnersville, NJ (US); Daniel James Olson, Voorhees, NJ (US); Robert Hugh Brady, Brookfield, CT (US); Stephen Colavito, Garnet Valley, PA (US); Kevin Saber, Sewell, NJ (US); Thomas Haggerty, Blackwood, NJ (US); David M. Wilz, Sr., Sewell, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/160,897

(22) Filed: Jun. 15, 2011

(65) Prior Publication Data

US 2012/0318868 A1   Dec. 20, 2012

(51) Int. Cl.
*G02B 26/10* (2006.01)
*G06K 7/10* (2006.01)
*G06K 9/22* (2006.01)
*G06K 19/06* (2006.01)

(52) U.S. Cl. .................................................. 235/462.25
(58) Field of Classification Search ............... 235/462.1, 235/462.25

See application file for complete search history.

(56) References Cited

U.S. PATENT DOCUMENTS

| | | | | |
|---|---|---|---|---|
| 5,200,597 | A | * | 4/1993 | Eastman et al. .............. 235/455 |
| 5,717,194 | A | * | 2/1998 | Forbes et al. ............. 235/462.32 |
| 5,804,809 | A | * | 9/1998 | Eastman et al. ......... 235/462.42 |
| 2006/0144944 | A1 | * | 7/2006 | Vinogradov et al. ......... 235/454 |

OTHER PUBLICATIONS

Davis, Christopher C. Lasers and electro-optics : fundamentals and engineering. Cambridge ; New York : Cambridge University Press, 1996. p. 351.*

* cited by examiner

*Primary Examiner* — Thien M Le
*Assistant Examiner* — Toan Ly
(74) *Attorney, Agent, or Firm* — Summa, Additon & Ashe, P.A.

(57) ABSTRACT

The system includes a housing having a light transmission window and produces an extremely-elongated laser beam having an elongation ratio (ER) that is defined as greater than 4.5 for any point within the working range of the laser scanning bar code symbol reading system. A laser scanning mechanism is provided for scanning the extremely-elongated laser beam out the light transmission window and across a scanning field defined external to the housing, in which a bar code symbol is present for scanning by the extremely-elongated laser scanning beam.

16 Claims, 29 Drawing Sheets

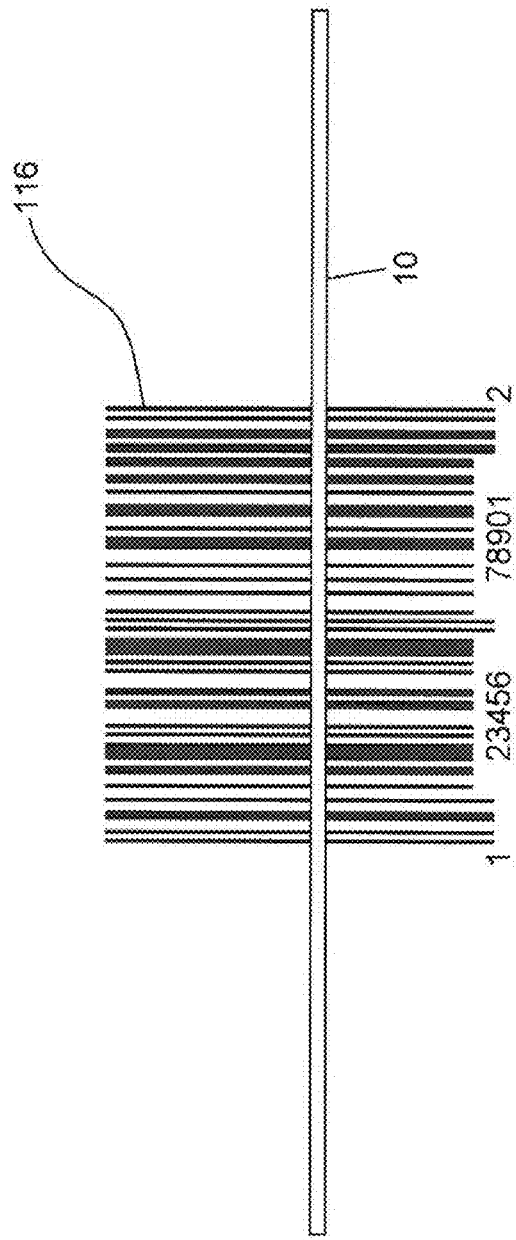

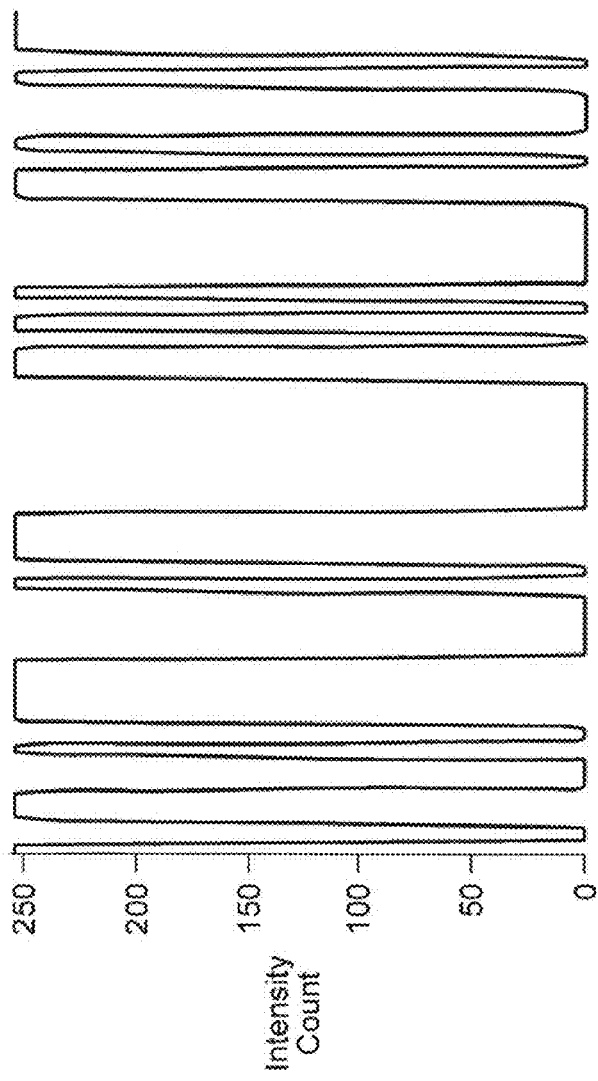
FIG. 2A2
(PRIOR ART)

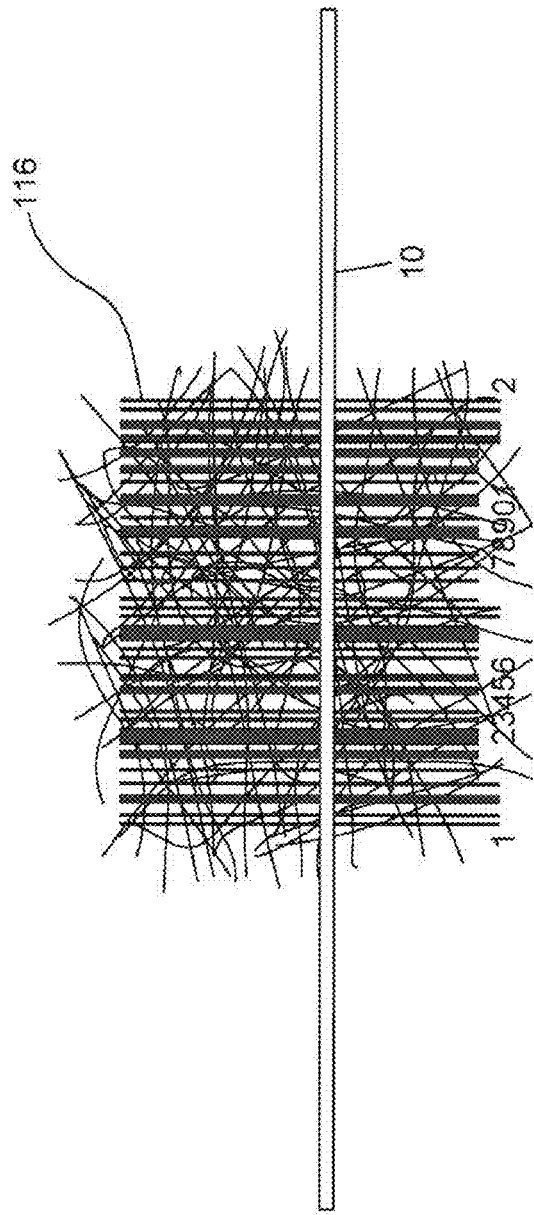
FIG. 2B1
(PRIOR ART)

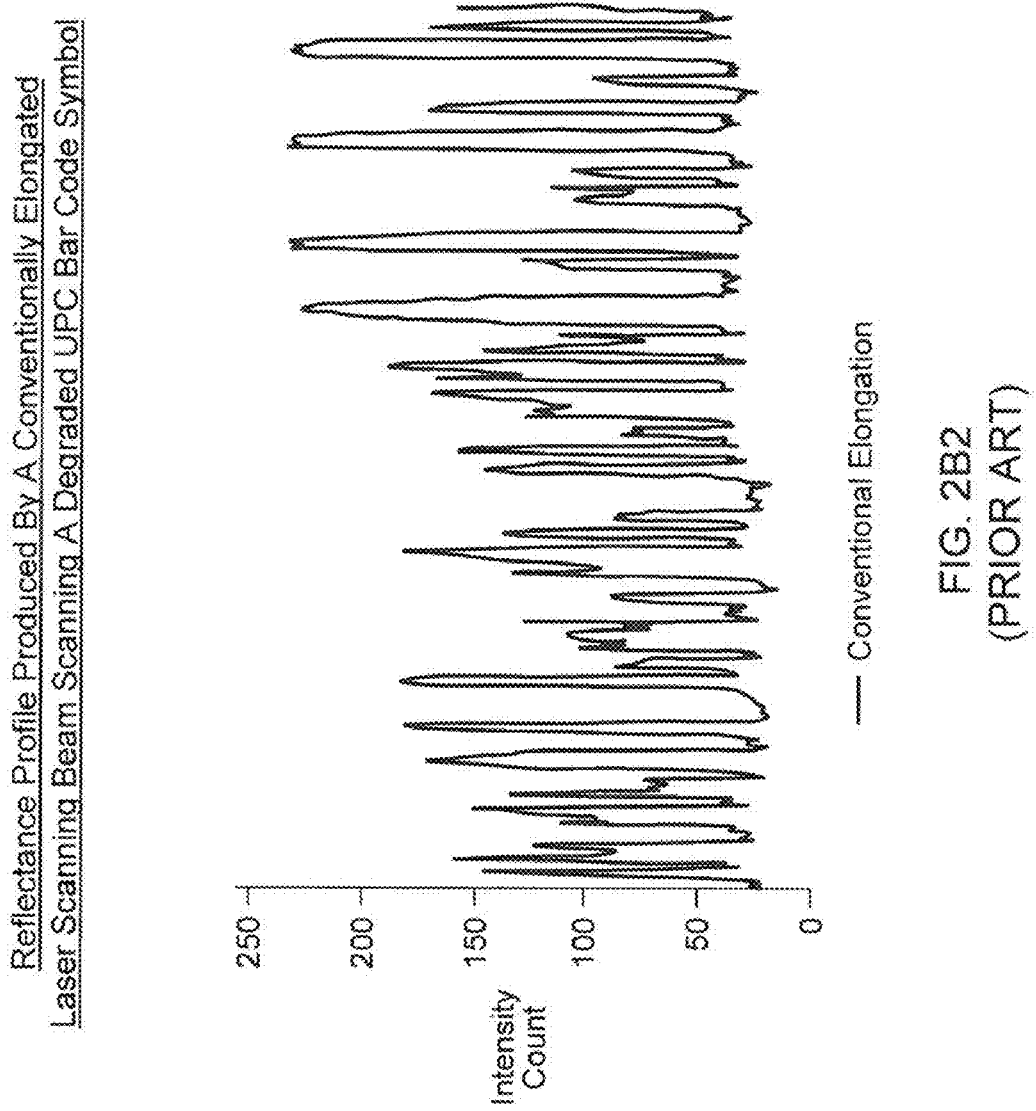

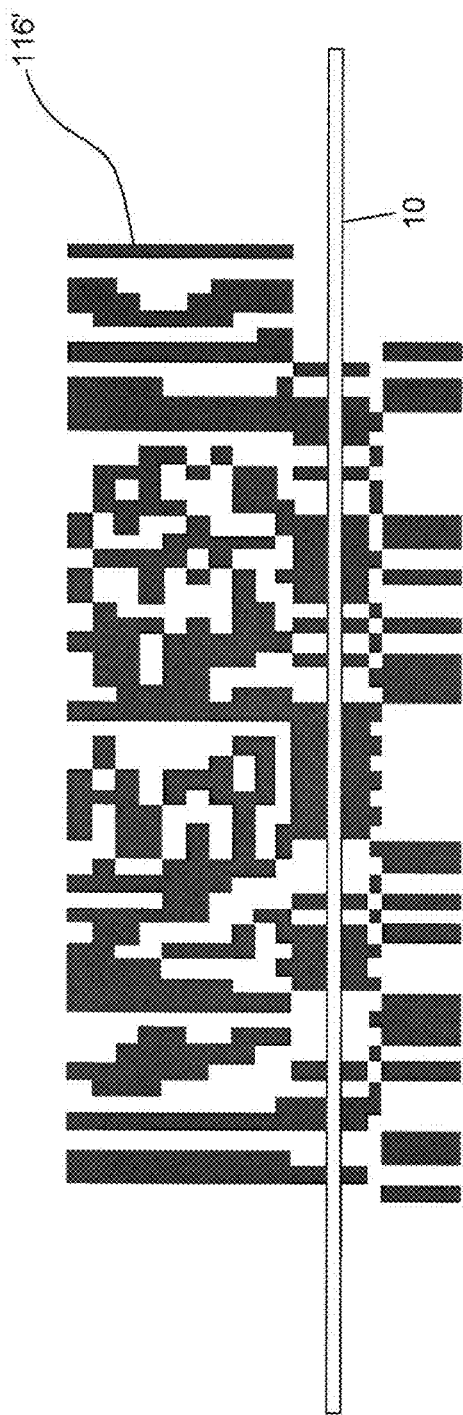
FIG. 2C1 (PRIOR ART)

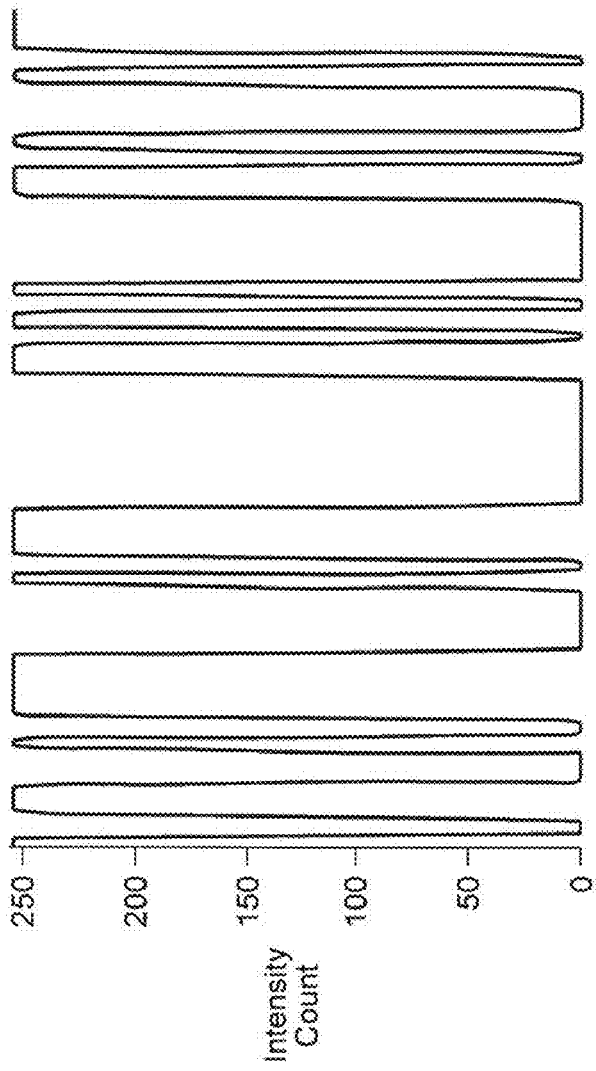
FIG. 2C2
(PRIOR ART)

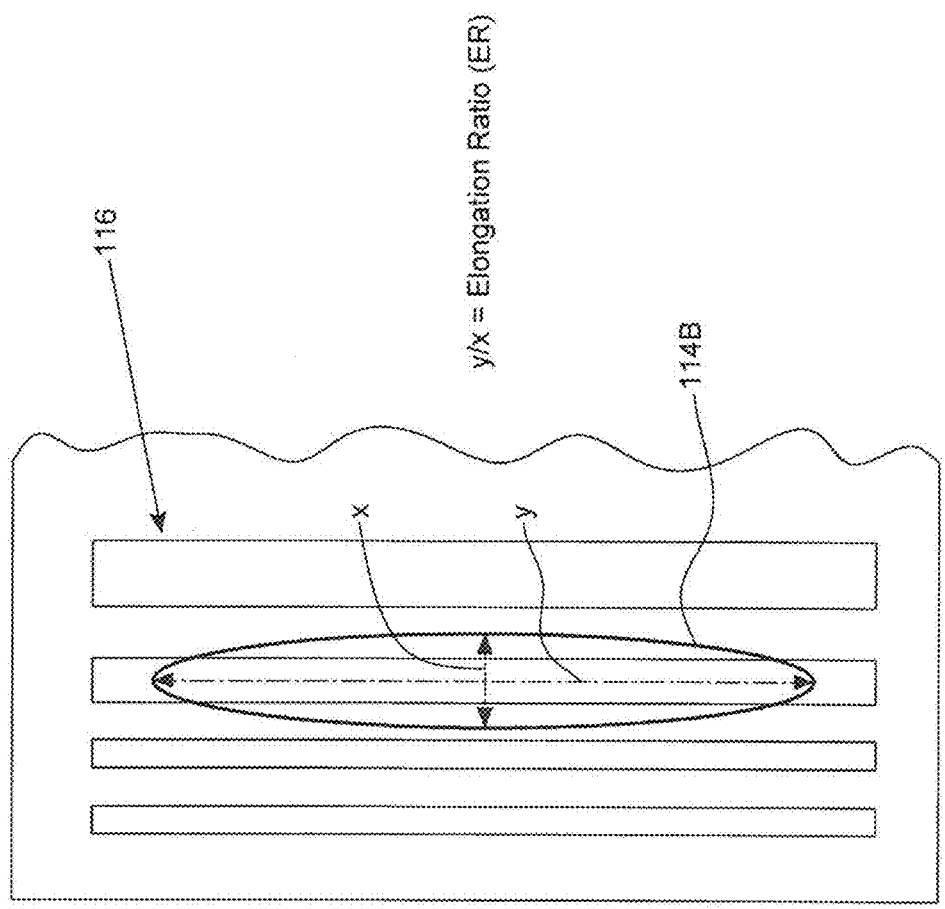

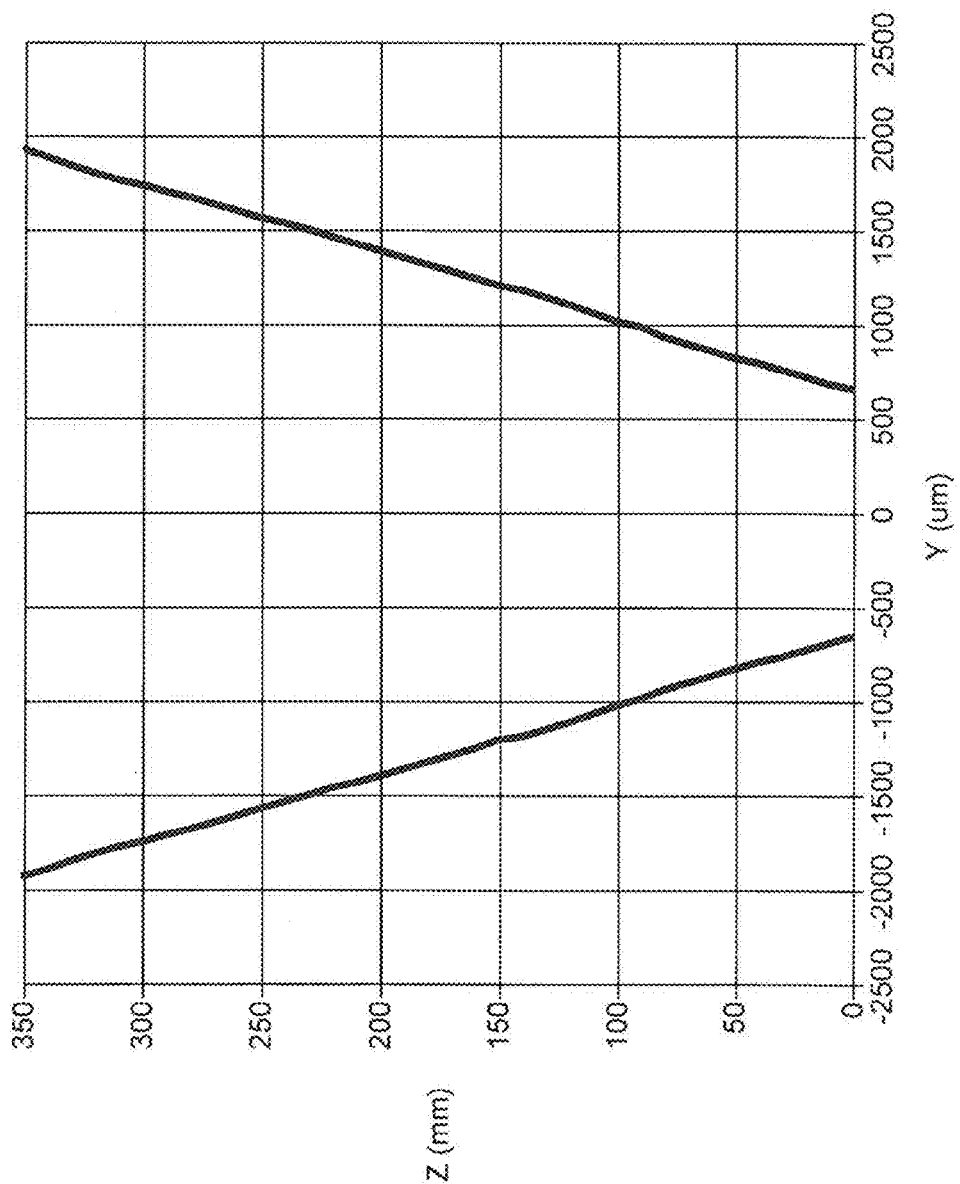

BAR CODE SYMBOL READING SYSTEM EMPLOYING AN EXTREMELY ELONGATED LASER SCANNING BEAM CAPABLE OF READING POOR AND DAMAGED QUALITY BAR CODE SYMBOLS WITH IMPROVED LEVELS OF PERFORMANCE

BACKGROUND OF DISCLOSURE

1. Field of Disclosure

The present disclosure relates to improvements in bar code symbol reading systems employing laser scanning beams having improved laser beam characteristics which enable the reading of poor quality and/or damaged bar code symbols with enhanced levels of performance.

2. Brief Description of the State of Knowledge in the Art

It is well known that poor quality bar codes and damaged bar codes typically results in decreased throughput at the retail point of sale (POS).

Various techniques have been developed to read poor quality bar codes and damaged bar codes. Such techniques include using: (i) adaptive signal processing gain adjustments and threshold levels (usually performed over a period of several sweeps across the bar code); (ii) reduced signal processing bandwidth to limit high frequency components of scanned data (i.e. limits scanner resolution); (iii) improved decode algorithms to allow for noise in bar code printing; and (iv) stitching algorithms to acquire a full decode out of partially successful attempts to acquire a whole bar code result.

In addition to the above techniques, it is well known to use of an elongated laser beam in the cross-sectional direction of laser beam scanning motion, so as to help average out spatial noise and improve the signal to noise (SNR) of the laser scanning bar code reading system. This technique can be used to read both 1D and 2D stacked bar code symbols.

For example, U.S. Pat. No. 5,621,203 discloses the use of an elongated laser beam for scanning 2D stacked bar code symbols and detecting reflected light using a linear image detector. As disclosed, the elongated laser beam which diverges in the elongated cross-sectional dimension. Also, the elongated cross-sectional dimension of the beam, in the plane of the symbol, is preferably long enough to illuminate the entirety of one dimension of a row of the symbol, at one time. The beam preferably does not converge to a waist in the elongated cross-sectional dimension.

FIG. 1 shows a bar code symbol reader 1 scanning a conventionally-elongated laser beam 10 across a bar code symbol 116. FIG. 2A1 shows a good quality UPC bar code symbol being scanned by the conventionally elongated laser scanning beam 10 from the bar code symbol reader of FIG. 1. The reflectance intensity profile produced while scanning this good quality code symbol with the conventionally elongated laser scanning beam 10 is shown in FIG. 2A2.

FIG. 2B1 shows a degraded UPC bar code symbol being scanned by a conventionally elongated laser scanning beam 10 generated from the laser scanning bar code symbol reader of FIG. 1. FIG. 2B2 shows the reflectance profile produced from the degraded bar code symbol using the conventionally elongated laser scanning beam produced from bar code symbol reader of FIG. 1.

FIG. 2C1 shows the second layer of a good quality stacked 2D bar code symbol being scanned by a conventionally elongated laser scanning beam 10 produced from the laser scanning bar code symbol reader of FIG. 1. FIG. 2C2 shows the reflectance profile produced from stacked 2D bar code symbol using the conventionally-elongated laser scanning beam 10 produced from the bar code symbol reader of FIG. 1.

Using conventionally-elongated laser beams to scan bar code symbol structures with 2D surface noise smoothes out (i.e. via spatial averaging) the reflection intensity profile of such code symbols which, in turn, increases the signal to noise (SNR) performance of the bar code symbol reader.

The elongation ratio (ER) of a laser beam, defined as the ratio of laser beam height (y) over laser beam width (x) measured along the direction of beam travel (Z) of the laser scanning beam, provides a measure of how much the laser beam is elongated along the cross (i.e. y) scan dimension of the beam, relative to the scan dimension (i.e. x direction). For known conventional laser scanning systems, the laser beam elongation ratio (ER) measures in the range of 1 to about 4.5, across the working range of conventional laser scanning bar code symbol reading systems, as illustrated in FIG. 2D.

However, hitherto, little has been known or disclosed about how to optimize the beam elongation ratio (ER) for a laser scanning bar code symbol reading system, so as to achieve enhanced levels of SNR performance when reading poor quality or damaged bar code symbols of various kinds of symbologies (e.g. UPC, GS1 2D stacked bar codes, etc).

Thus, there is a great need for improvement in the SNR of reflection intensity signals detected during laser scanning bar code symbols, and for this improvement to be achieving using laser scanning beams having optimized laser beam characteristics, while avoiding the shortcomings and drawbacks of prior art apparatus and methodologies.

SUMMARY AND OBJECTS OF THE PRESENT DISCLOSURE

Accordingly, it is a primary object of the present disclosure is to provide a new and improved way of and means for improving the SNR of reflection intensity signals detected during laser scanning bar code symbols, and to do so using laser scanning beams having optimized laser beam characteristics, while avoiding the shortcomings and drawbacks of prior art apparatus and methodologies.

Another object is to provide a new and improved way of reading poor quality and damaged barcodes by scanning such bar code symbols using a laser scanning beam having an extremely elongated cross-scan dimension, so as to average out defects in the bar code symbol during laser scanning operations.

Another object is to provide a bar code symbol reading system employing an extremely-elongated laser beam having an elongation ratio (ER) that can is quantified as: Y/X>4.5; (i) for any point within the working range of the laser scanning bar code scanner (i.e. along the z direction of the scanner); (ii) where Y indicates the laser beam height measured in the cross-scan direction or Y dimension laser beam, and X indicates the laser beam width measured in the scan direction or X dimension of the laser beam; and (iii) where the laser beam height (Y) and laser beam diameter (X) are measured at $1/e^2$ intensity clip level.

Another object is to provide a bar code symbol reading system employing a curved mirror for creating laser beam elongation having an elongation ratio (ER) greater than 4.5 along the length of beam propagation within the working range of the system, so as to improve the SNR performance of the system.

Another object is to provide a bar code symbol reading system employing a cylindrical lens for creating laser beam elongation having an elongation ratio (ER) greater than 4.5 along the length of beam propagation within the working range of the system, so as to improve the SNR performance of the system.

Another object is to provide a bar code symbol reading system employing an extremely elongated laser beam that can also be used in a bi-optic laser scanning systems, omni-directional laser scanning systems, and laser-illuminated linear imaging systems.

Another object is to provide a bar code symbol reading system employing an extremely elongated laser beam that has been designed to balance GS1 composite stacked code performance with poor quality code performance.

Another object is to provide a bar code symbol reading system employing an extremely elongated laser beam that is can be used to read poor quality bar code symbols over the working range of the reader, as well as at the point of highest resolution (i.e. beam waist).

Another object is to provide a bar code symbol reading system employing an extremely elongated laser beam having extreme elongation occurring at the waist of the beam profile at a value of 2.36 inches (i.e. 60 mm) from the light transmission window of the system.

These and other objects will become more apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 2A1 is a graphical representation of a good or perfect quality UPC bar code symbol being scanned by a conventionally-elongated laser scanning beam produced from the hand-supportable laser scanning bar code symbol reader of FIG. 1;

FIG. 2A2 is a graphical representation of the reflectance profile produced by a conventionally-elongated laser scanning beam projected from the hand-supportable laser scanning bar code symbol reader of FIG. 1, and used to scan the UPC bar code symbol shown in FIG. 2A1;

FIG. 2B1 is a graphical representation of a degraded UPC bar code symbol being scanned by a conventionally-elongated laser scanning beam produced from the hand-supportable laser scanning bar code symbol reader of FIG. 1;

FIG. 2B2 is a graphical representation of the reflectance profile produced by a conventionally-elongated laser scanning beam projected from the hand-supportable laser scanning bar code symbol reader of FIG. 1, and used to scan the degraded UPC bar code symbol shown in FIG. 2B1;

FIG. 2C1 is a graphical representation of a the second layer of a perfect stacked 2D bar code symbol being scanned by a conventionally-elongated laser scanning beam produced from the hand-supportable laser scanning bar code symbol reader of FIG. 1;

FIG. 2C2 is a graphical representation of the reflectance profile produced by a conventionally-elongated laser scanning beam projected from the hand-supportable laser scanning bar code symbol reader of FIG. 1, and used to scan the stacked 2D bar code symbol shown in FIG. 2C1;

FIG. 7A is a schematic representation of a linear bar code symbol at a moment of scanning by the extremely-elongated laser scanning beam produced from the laser scanning bar code symbol reader of FIG. 3, illustrating the x and y scanning reference directions and definition of the Elongation Ratio (ER=Y/X);

FIG. 7C is a graphical representation illustrating the y-scan dimension (i.e. height) of the extremely-elongated laser scanning beam produced from the laser scanning bar code symbol reader of FIG. 3, plotted as a function of distance along the direction of propagation (z) of the laser scanning beam;

DETAILED DESCRIPTION OF THE ILLUSTRATIVE EMBODIMENTS OF THE PRESENT DISCLOSURE

Figure 1:
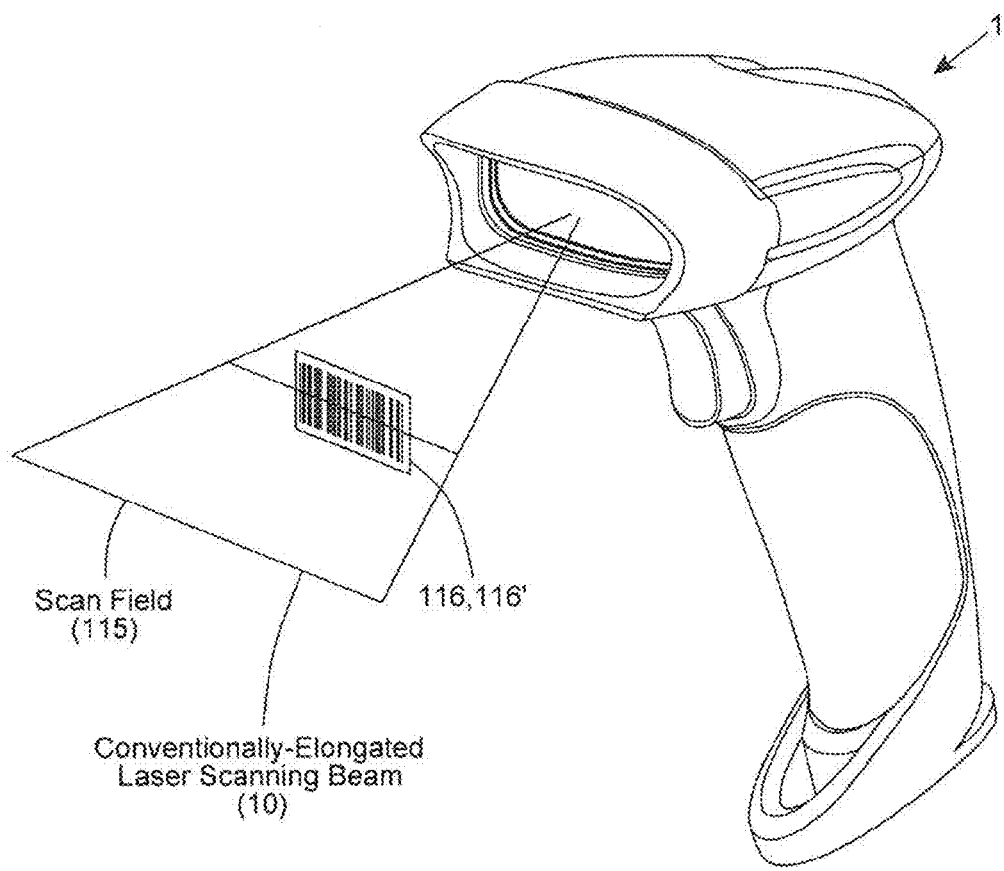
FIG. 1 is a perspective of a hand-supportable laser scanning bar code symbol reader employing a conventionally-elongated laser scanning beam for reading bar code symbols.
Figure 2D:
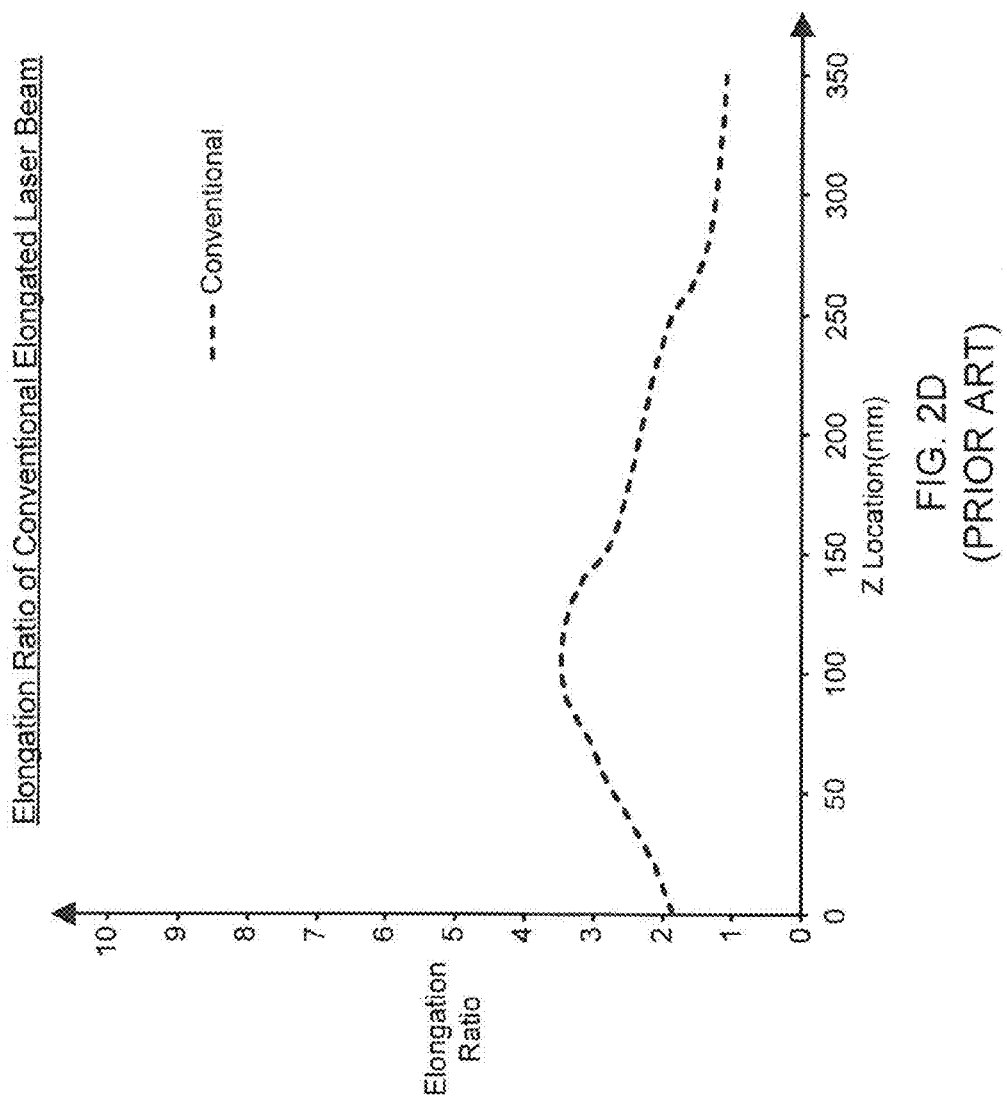
FIG. 2D is a graphical representation showing the elongation ratio (Y/X) of a conventionally-elongated laser beam a function of location along beam travel direction (Z)

Referring to the figures in the accompanying Drawings, the illustrative embodiment of the digital imaging system will be described in greater detail, wherein like elements will be indicated using like reference numerals.

Specification of the Bar Code Symbol Reading System of the Illustrative Embodiment Employing an Extremely-Elongated Laser Scanning Beam to Enhance Reading Performance of Poor Quality and Damaged Bar Code Symbols Referring now to FIGS. 3 through 8, an illustrative embodiment of a manually-triggered/automatically-triggered hand-supportable laser scanning bar code symbol reading system 1 will be described in detail.

Figure 3:
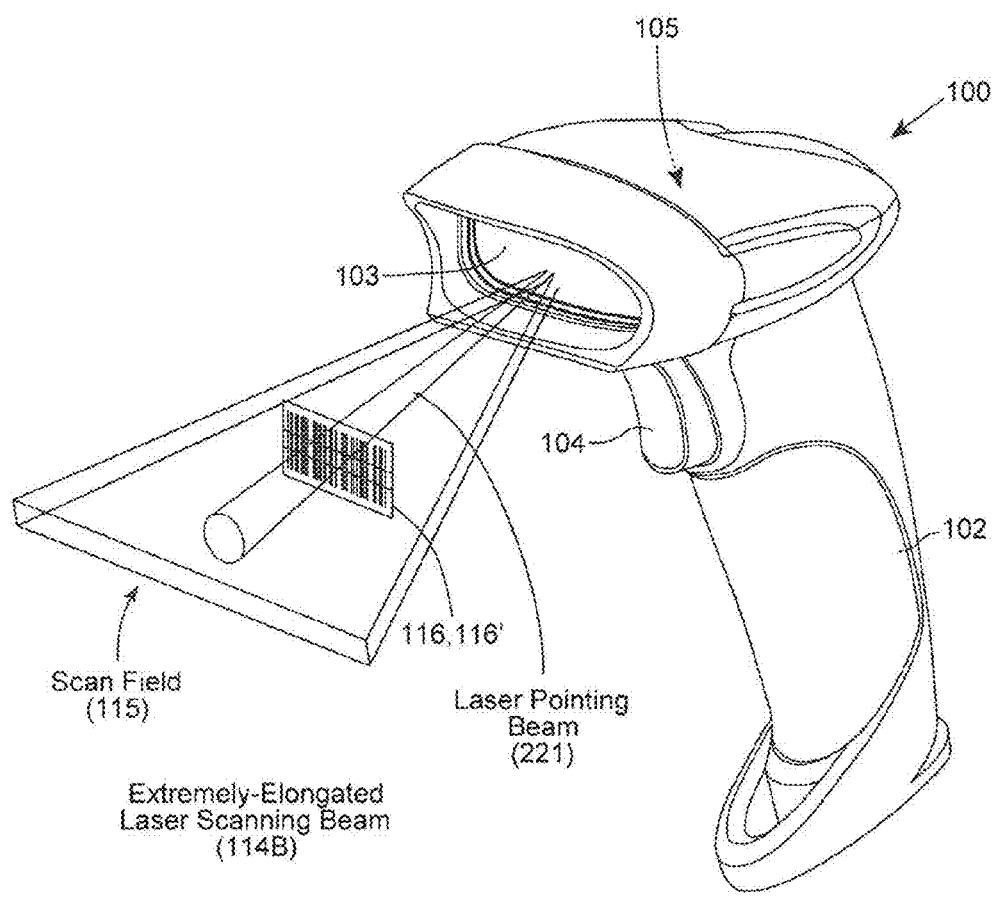
FIG. 3 is a perspective of a hand-supportable laser scanning bar code symbol reader employing an extremely-elongated laser scanning beam for reading bar code symbols, in accordance with the present disclosure.
Figure 4:
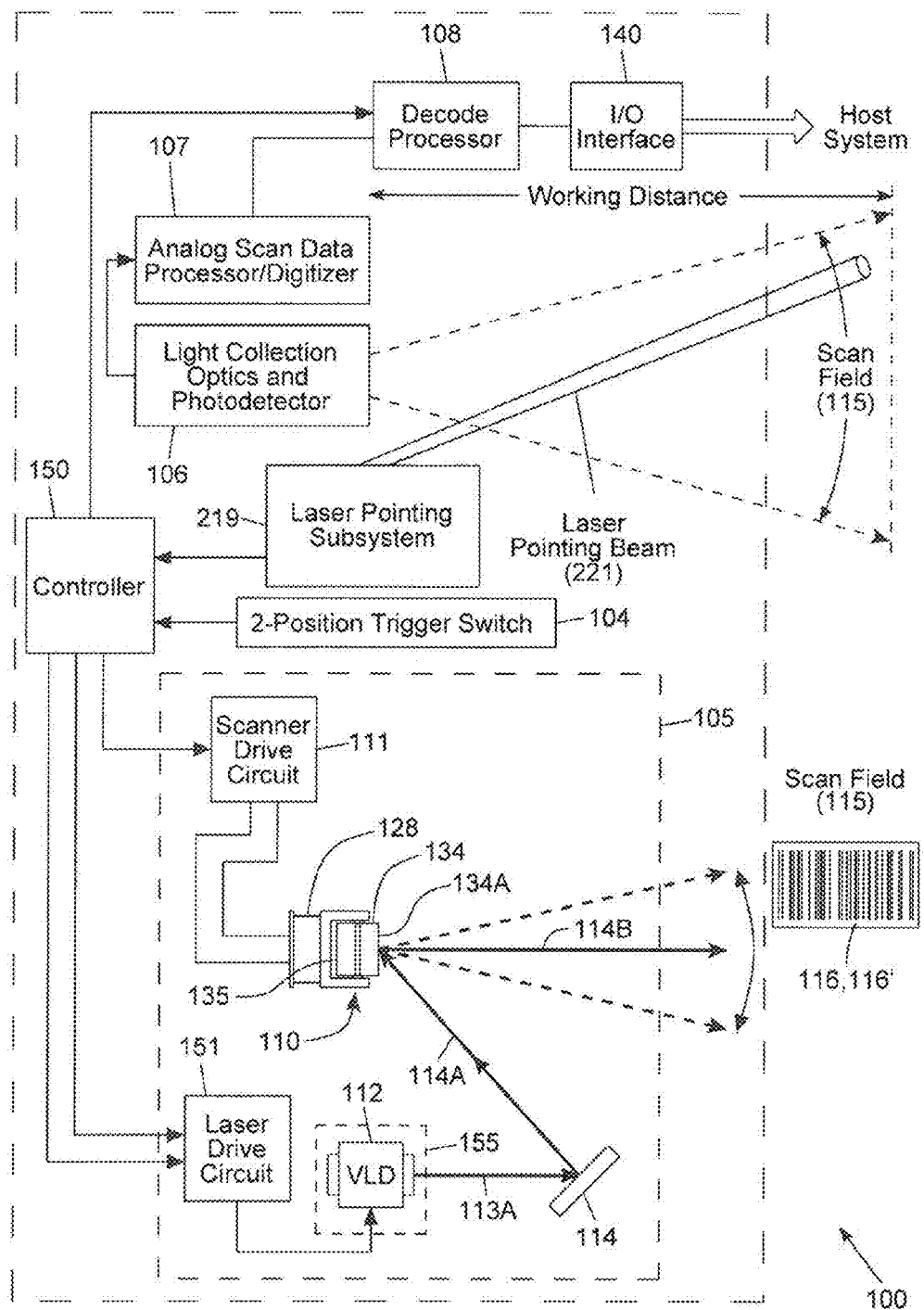
FIG. 4 is a schematic block diagram describing the primary system components within the hand-supportable laser scanning bar code symbol reader of FIG. 3.
Figure 8:
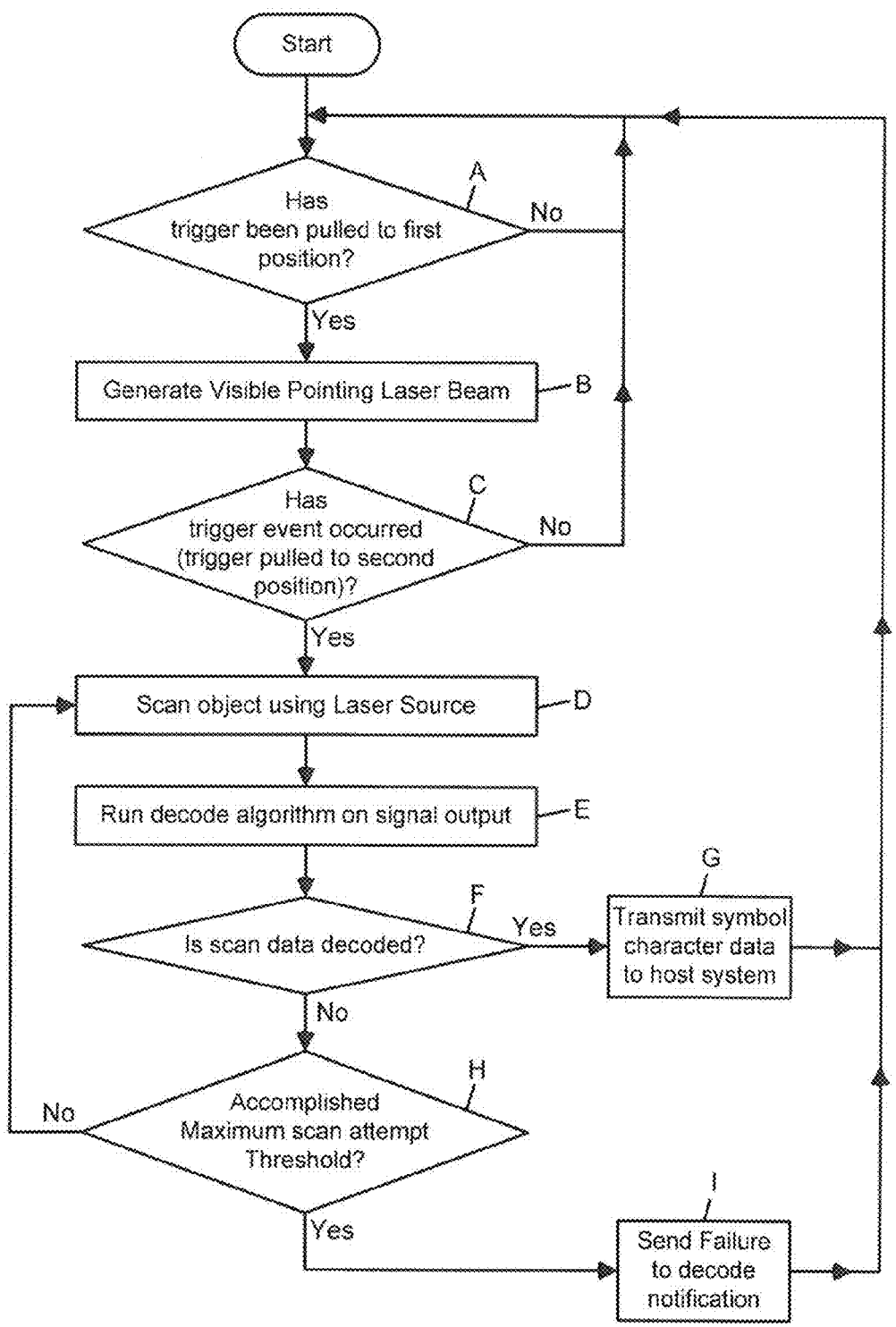
FIG. 8 is a flow chart describing the steps involved during the operation of the hand-supportable laser scanning bar code symbol reader of FIG. 3

As shown in FIGS. 3 and 4, the laser scanning bar code symbol reader 100 comprises: a hand-supportable housing 102 having a head portion and a handle portion supporting the head portion; a light transmission window 103 integrated with the head portion of the housing 102; a manually-actuated two-position trigger switch 104 integrated with the handle portion of the housing, for activating its laser scanning module 105 with a laser scanning field 115; an IR-based object detection subsystem 219 generating an IR beam within the laser scanning field, as shown in FIG. 3, for automatically detecting the presence of an object in the laser scanning field, and triggering the system when an object is automatically detected in the scanning field; a laser scanning module 105, for repeatedly scanning, across the laser scanning field, a visible extremely-elongated laser beam 113 generated by an extremely-elongated laser beam production module 155; wherein the laser scanning module 105 also includes a laser drive circuit 151 for receiving control signals from system controller 150, and in response thereto, generating and delivering laser (diode) drive current signals to the laser source 112, to produce an extremely-elongated laser scanning beam during the method of bar code symbol reading described in FIG. 8; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; programmed decode processor 108 for decode processing digitized data signals, and generating symbol character data representative of each bar code symbol scanned by extremely-elongated laser scanning beam 114B; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

As shown in FIG. 4, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112, and associated optics 161, 163 and 164 for producing an extremely-elongated laser beam 113; and a beam deflecting mirror 114 for deflecting the laser beam 113, as incident beam 114A towards the mirror component of the laser scanning assembly 110, which sweeps the deflected laser beam 114B across the laser scanning field and a bar code symbol 116 that might be simultaneously present therein during system operation.

As shown in FIG. 4, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a drive circuit 111 so that it generates magnetic forces on opposite poles of the permanent magnet 135, during scanning assembly operation.

Preferably, IR-based object detection subsystem 219 is mounted in the front of its light transmission window 103 so that the IR light transmitter and IR light receiver components of subsystem 219 have an unobstructed view of an object within the laser scanning field of the system, as shown in FIG. 3. Also, the IR object presence detection module 219 can transmit into the scanning field 115, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

Figure 5A:
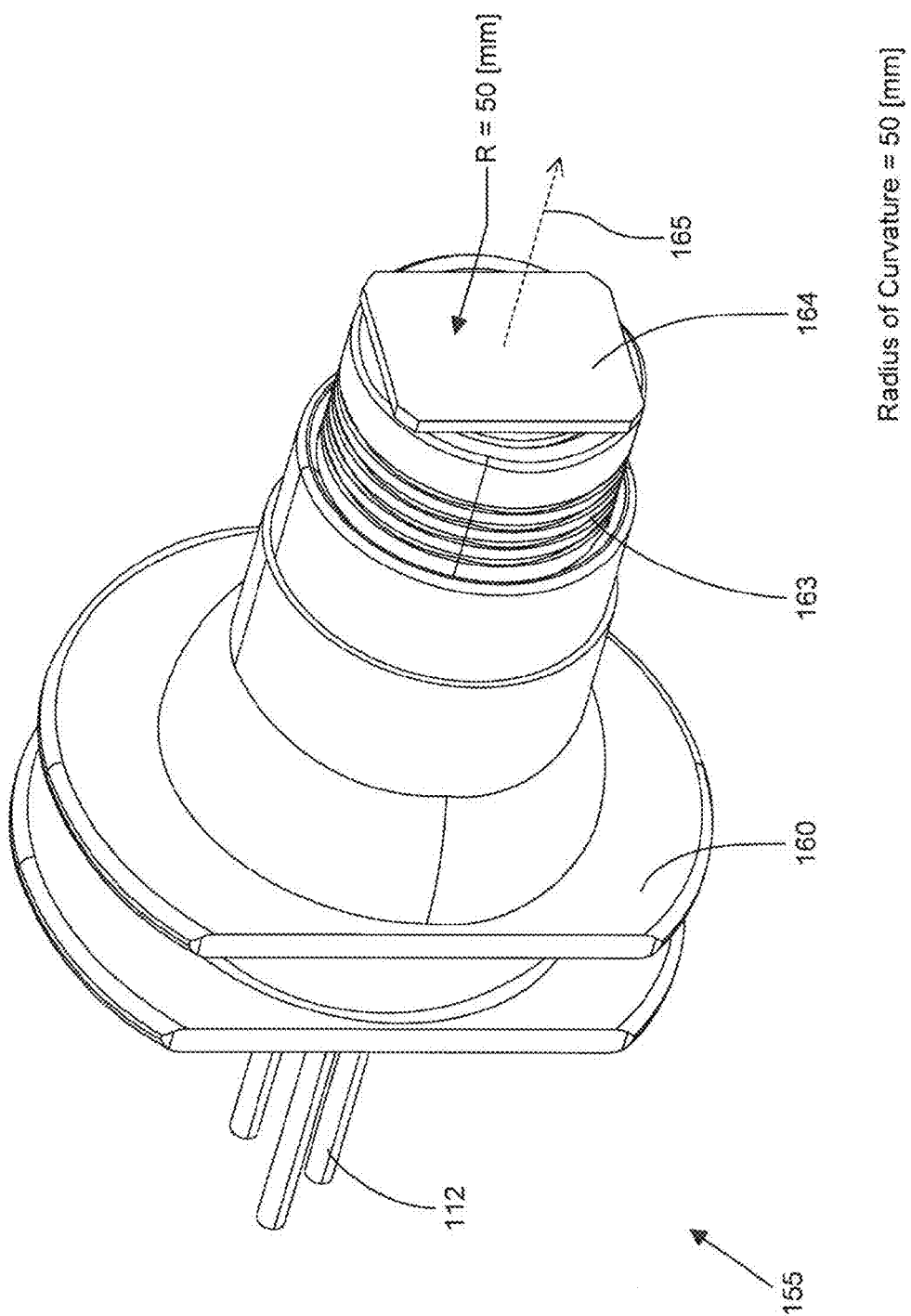
FIG. 5A is a perspective view of the laser beam production module employed in the hand-supportable laser scanning bar code symbol reader of FIG. 3.
Figure 5B:
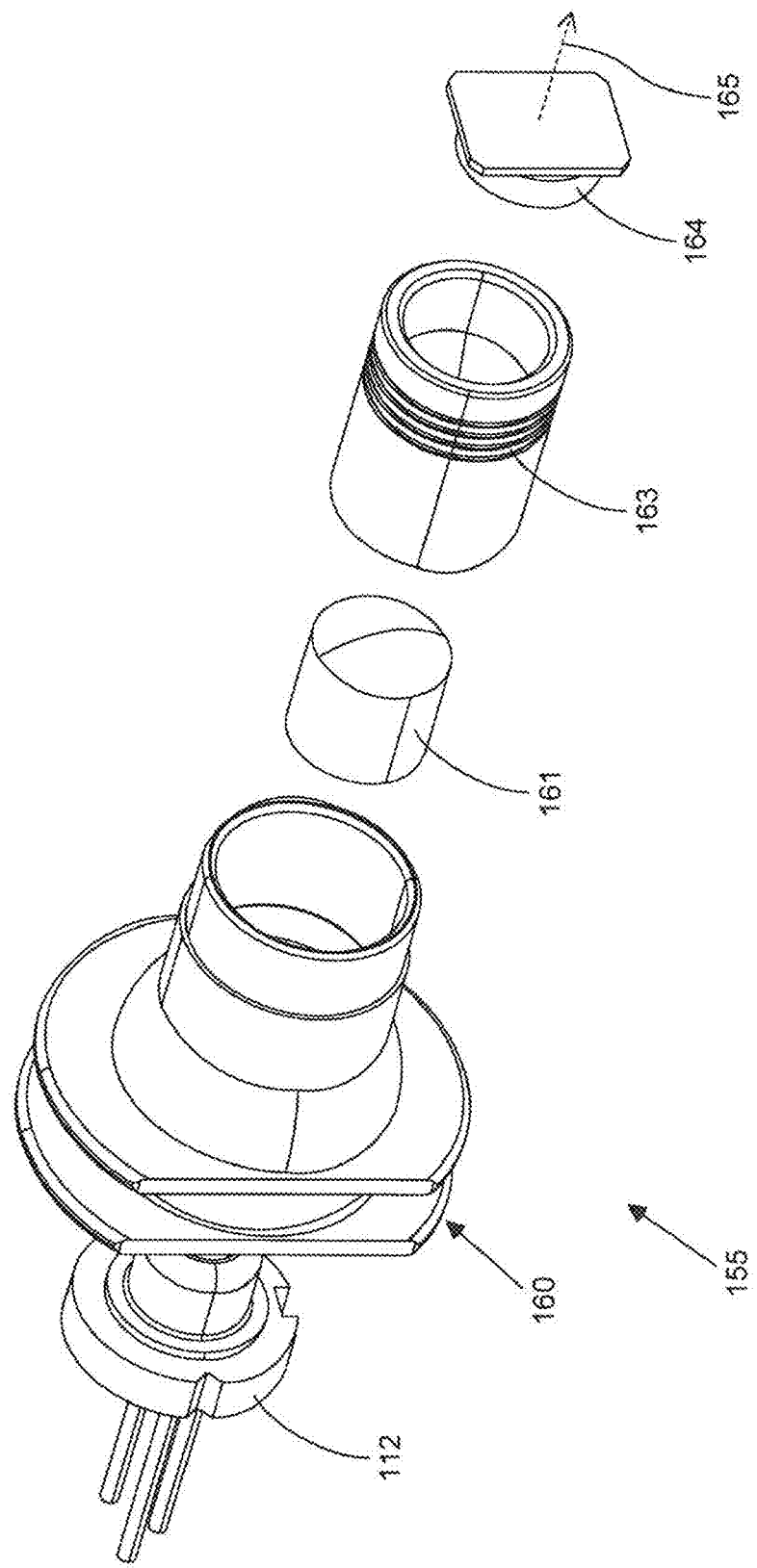
FIG. 5B is an exploded perspective view of the laser beam production module shown in FIG. 5A and employed in the hand-supportable laser scanning bar code symbol reader of FIG. 3.
Figure 5C:
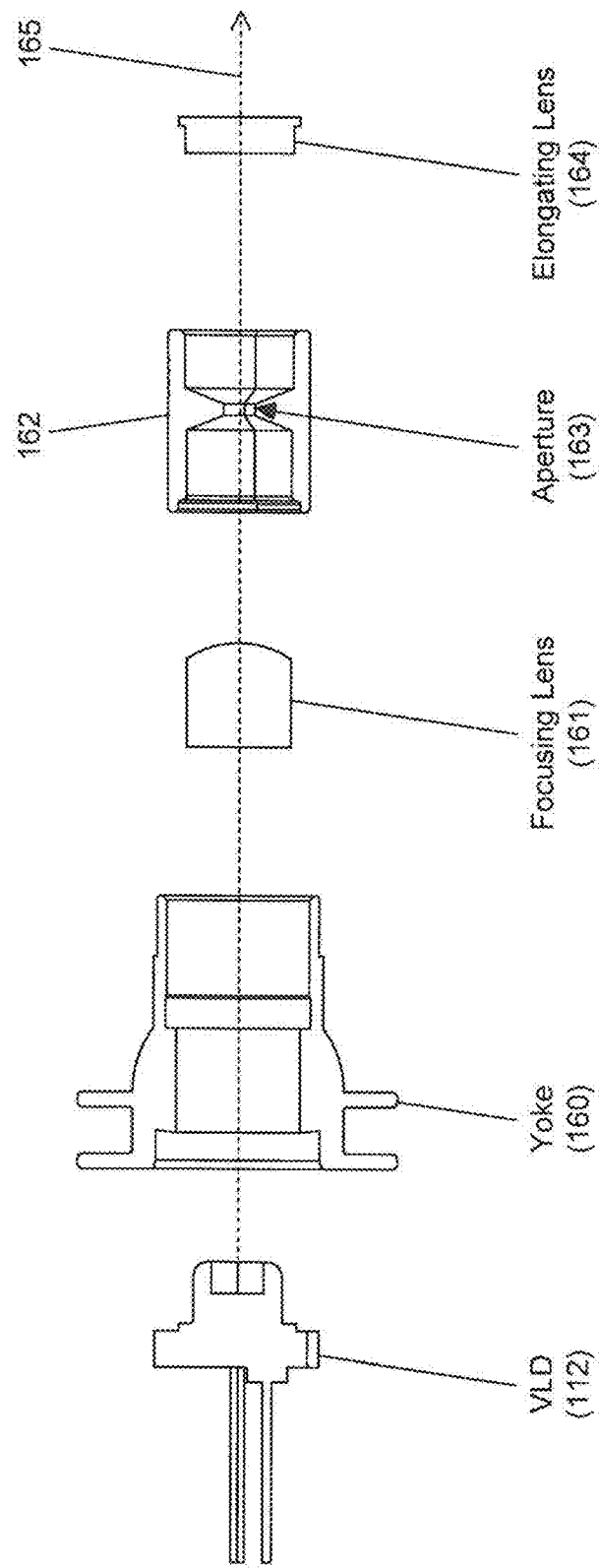
FIG. 5C is an exploded side view of the laser beam production module shown in FIG. 5A and employed in the hand-supportable laser scanning bar code symbol reader of FIG. 3.
Figure 5D:
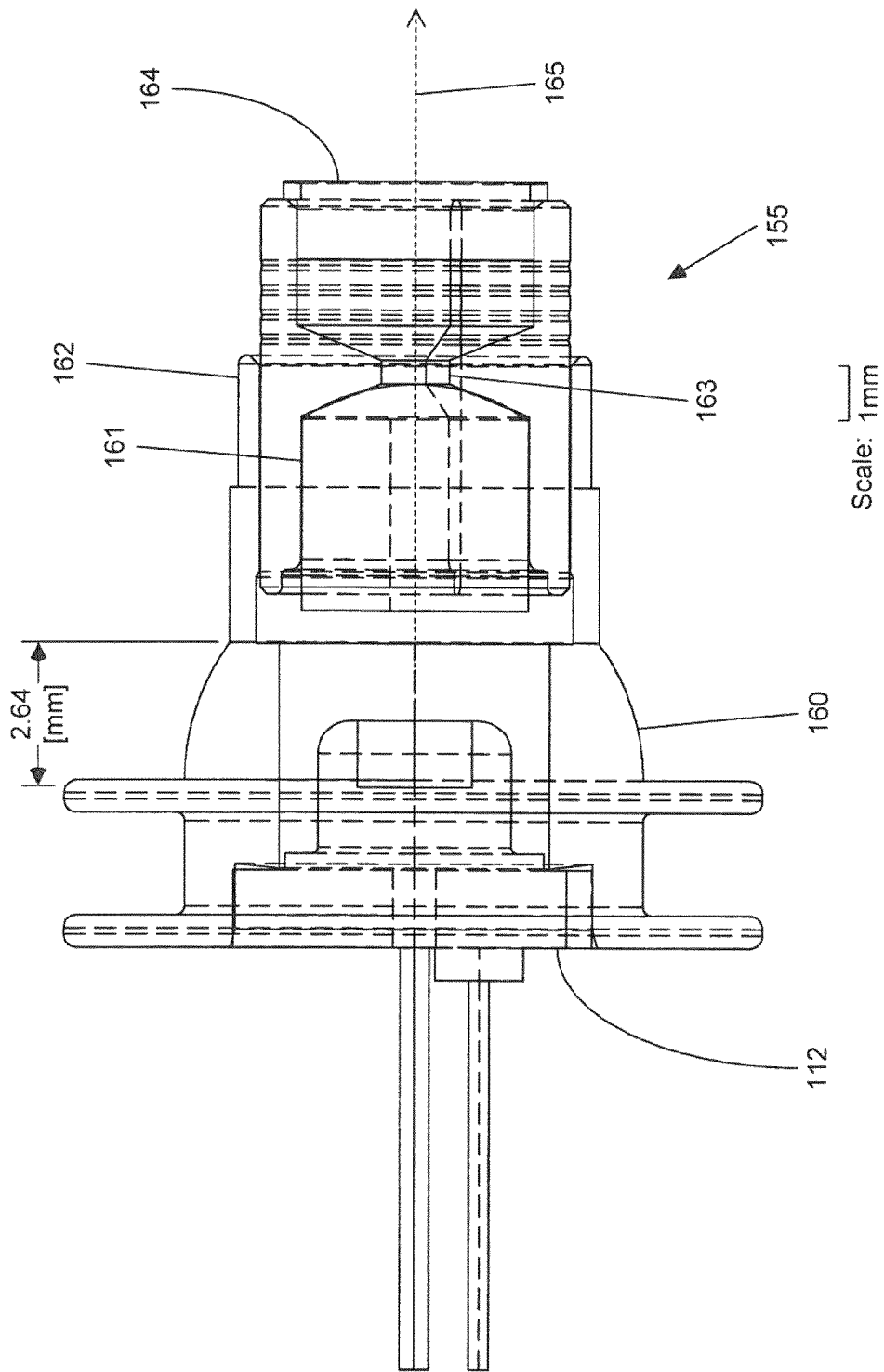
FIG. 5D is a cross-sectional view of the laser beam production module shown in FIG. 5A, fully assembled.

As shown in FIGS. 5A, 5B, the extremely-elongated laser beam production module 155 comprises: laser source 112 (e.g. VLD LD), installed in a yoke assembly 160, having a focusing/collimating lens (i.e. 4.0 [mm] focal length) 161; a lens holder 162 for holding focusing/collimating lens 161, and an aperture stop 163 having a 0.94 [mm] circular diameter, and also holding elongating cylindrical lens (having a radius of curvature of 50 [mm]) 163 along the common optical axis 165 of focusing lens 161, elongating lens 163, and VLD 112, as shown in FIG. 5D.

A primary object of laser beam production module 155 is to produce an laser beam 113 (114B) with an extreme elongation that can be quantified as Y/X>4.5, (i) for any point within the working range of the laser scanning bar code scanner (i.e. along the Z direction); (ii) where Y indicates the laser beam height measured in the cross-scan direction or Y dimension laser beam, and X indicates the laser beam width measured in the scan direction or X dimension of the laser beam; and (iii) where the laser beam height (Y) and laser beam diameter (X) are measured at 1/e2 intensity clip level. It has been discovered that this Elongation Ratio threshold, solves the problem of reading poor quality and damaged barcodes by using a laser scanning beam that has been elongated in the cross scan (Y) dimension so as to average out defects in the laser scanned bar code symbol structure.

Figure 7:
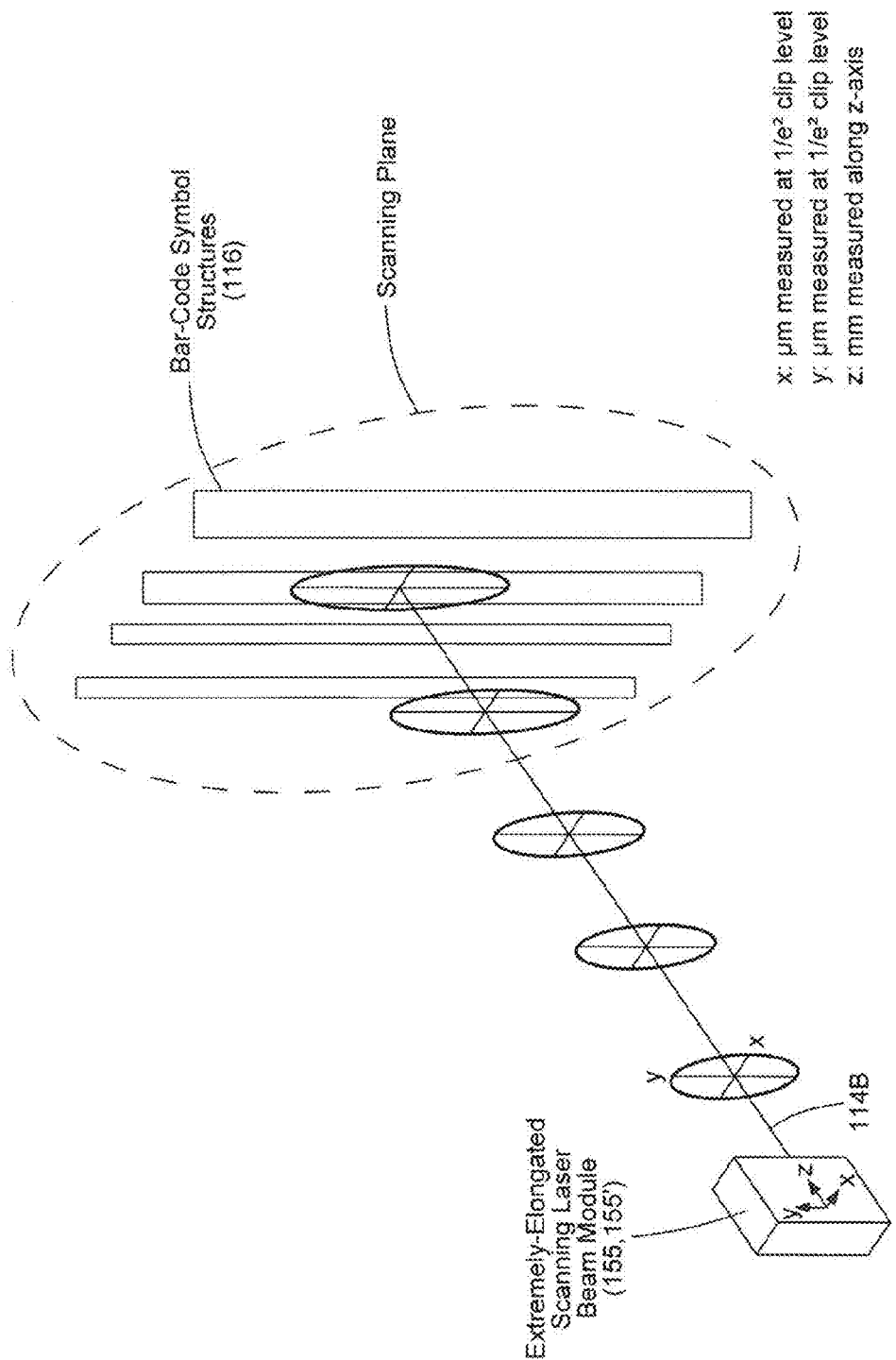
FIG. 7 is a schematic representation of an optical model for the laser scanning beam production module employed in the hand-supportable laser scanning bar code symbol reader of FIG. 3, illustrating the $1/e^2$ scan and cross scan dimensions of the beam profile of the extremely-elongated laser scanning beam being projected onto and scanned across a degraded bar code symbol.
Figure 7B:
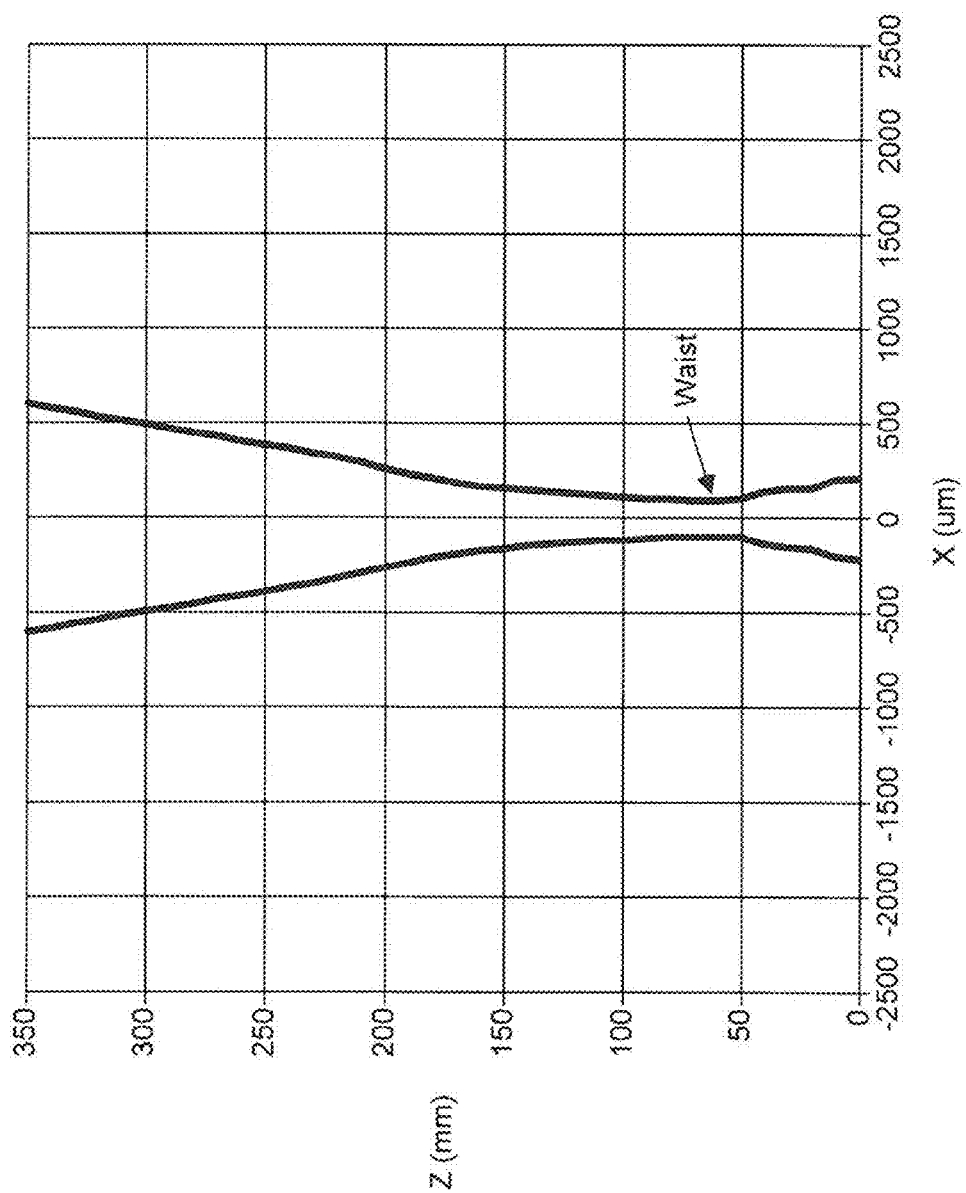
FIG. 7B is a graphical representation illustrating the x-scan dimension (i.e. width) of the extremely-elongated laser scanning beam produced from the laser scanning bar code symbol reader of FIG. 3, plotted as a function of distance along the direction of propagation (z) of the laser scanning beam.

By definition, the beam waist in the scan (x) direction is the smallest point of the laser beam in the x dimension, and as indicated in FIG. 7, the beam waist is located around 60 [mm] in the Z direction. As indicated in FIG. 7C, there is no beam waist in the Y dimension as the extremely-elongated laser beam 114B is completely divergent along the Z dimension. In FIGS. 7B and 7C, all laser beam dimension values are measured at the $1/e^2$ clip level. As indicated in FIG. 7, the extremely elongated laser beam 113 has extreme elongation around 1 inch from the face of the scanner, out to about 9 inches therefrom, with peak elongation occurring at the waist of the beam profile at a value of 2.36 inches (i.e. 60 [mm]).

Figure 6:
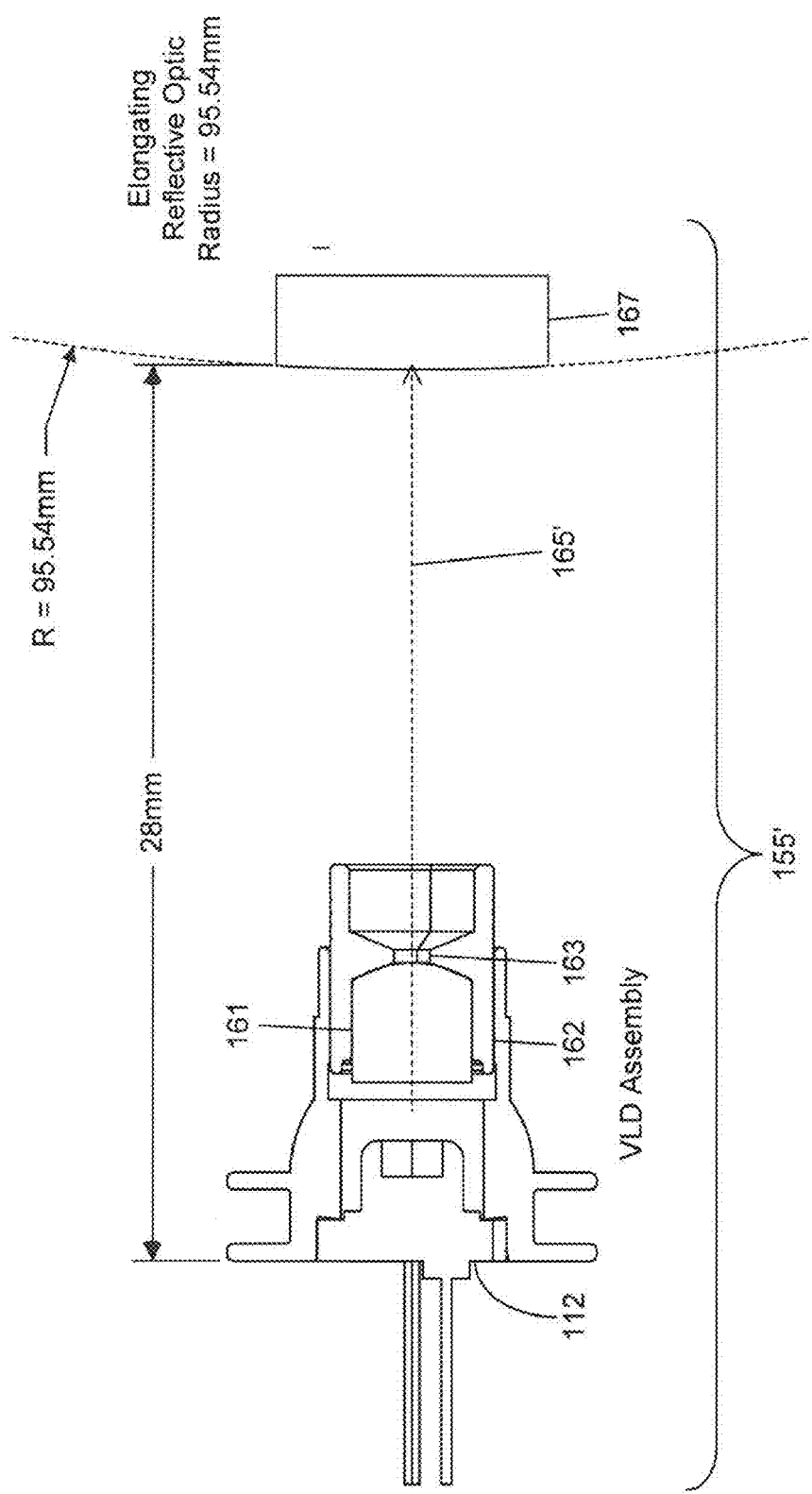
FIG. 6 is a perspective view of an alternative embodiment of the laser beam production module/assembly that can be employed in the hand-supportable laser scanning bar code symbol reader of FIG. 3, and shown comprising an elongated reflective element outside of the laser beam production module in lieu of the elongating lens employed in the embodiment shown FIGS. 5A through 5D.

An alternative embodiment of the extremely-elongated laser beam production module 155, indicated as 155' in FIG. 6, can be realize as assembly comprising: laser source 112 (e.g. VLD LD), installed in a yoke assembly 160, having a focusing/collimating lens (i.e. with 4.0 [mm] focal length) 161; a lens holder 162 for holding focusing lens 161, having an aperture stop 163 having a circular diameter of 0.94 [mm], along the common optical axis 165 of focusing lens 161, and VLD 112, as shown in FIG. 6; and a reflective-type beam elongating optical element (e.g. mirror) 163' having a radius of curvature of about 95.54 [mm].

The object of laser beam production module 155' is to produce an laser beam 113 with an extreme elongation that can be defined or rather quantified as Y/X>4.5 (i) for any point within the working range of the laser scanning bar code scanner (i.e. along the Z direction or direction of beam travel), (ii) wherein Y indicates the laser beam height measured in the cross-scan direction or Y dimension laser beam, and X indicates the laser beam width measured in the scan direction or X dimension of the laser beam, and (iii) wherein the laser beam height (Y) and laser beam diameter (X) are measured at $1/e^2$ intensity clip level. In all other respects, the laser beam characteristics for the laser beam 113 produced using the extremely-elongated laser beam production module 115' in FIG. 6 are similar to the characteristics of the laser beam produced using the extremely-elongated laser beam production module 155 shown in FIGS. 5A through 5D.

Figure 7D:
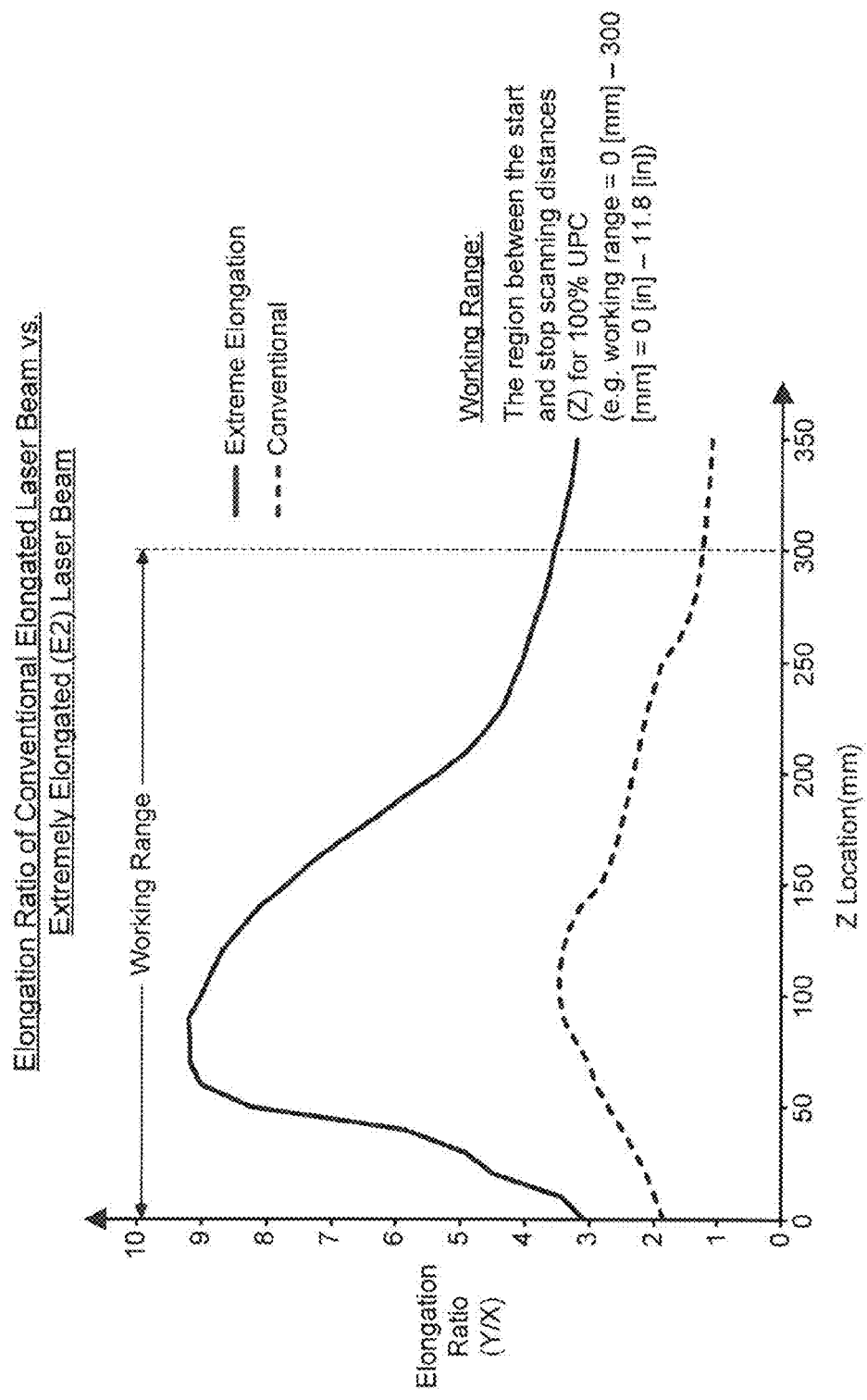
FIG. 7D is a graphical representation showing the elongation ratio (Y/X) of a conventionally-elongated laser beam a function of location along beam travel direction (Z), and in comparison, the elongation ratio (Y/X) of an extremely-elongated laser beam a function of location along beam travel direction (Z)

FIG. 7D shows the elongation ratio (Y/X) of a conventionally-elongated laser beam as a function of location along beam travel direction (Z), and in comparison, the elongation ratio (Y/X) of an extremely-elongated laser beam a function of location along beam travel direction (Z). Also shown in FIG. 7D, the Elongation Ratio (ER) of the extremely elongated laser beam of the present disclosure is significantly greater than the Elongation Ratio of any conventionally-elongated laser beam, known in the art, for any position (z) along the working distance of the laser scanning system.

Figure 7E:
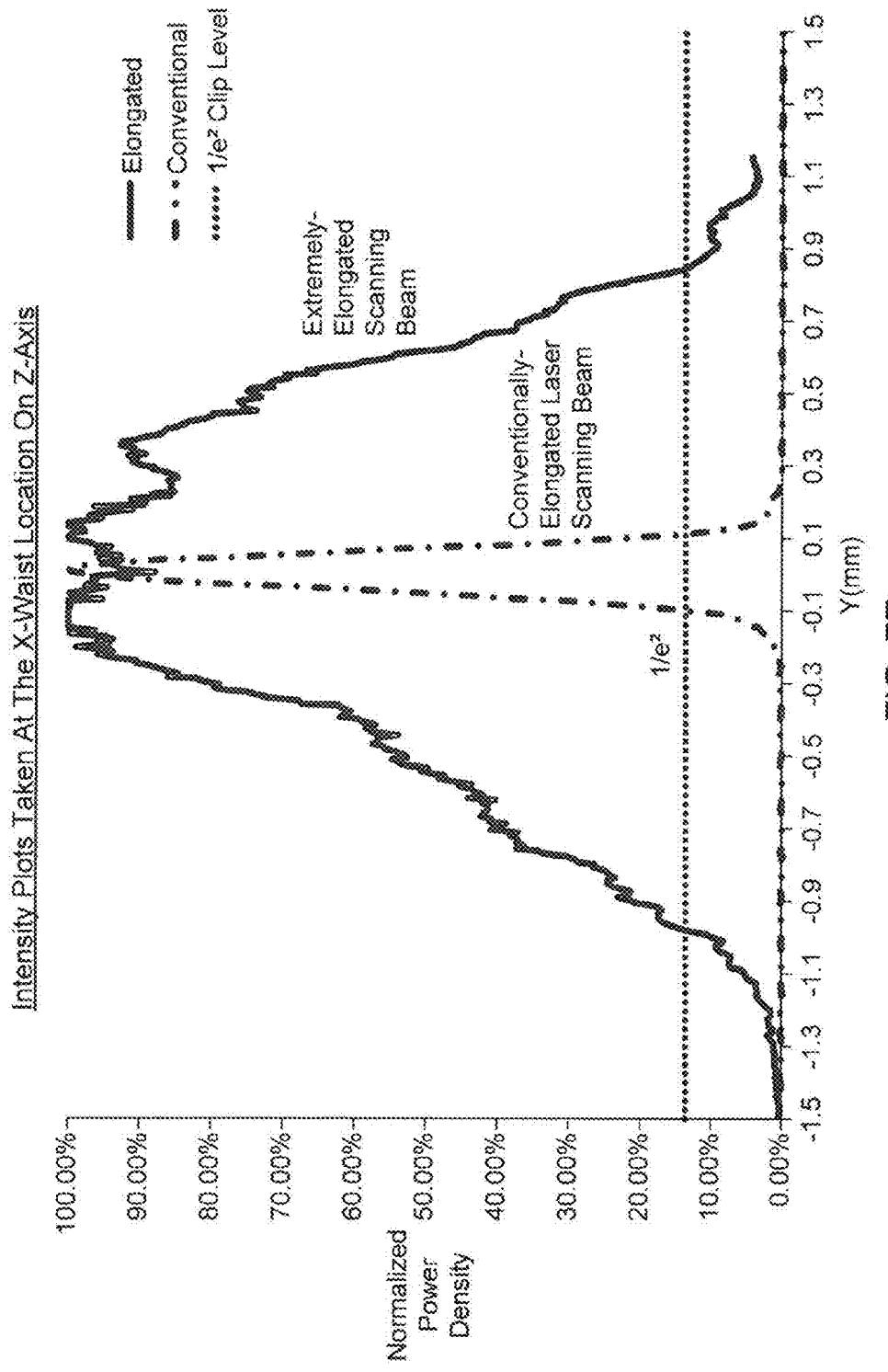
FIG. 7E is a graphical representation showing a comparison plot of a conventional elongation intensity profile measured at the x waist location shown in FIG. 7, versus the extreme elongation intensity profile measured at the x waist location.

FIG. 7E shows a comparison plot of a conventional elongation intensity profile measured at the x waist location shown in FIG. 7, versus the extreme elongation intensity profile measured at the x waist location.

FIGS. 7B and 7C show the X and Y dimension characteristics of the extremely-elongated laser scanning beam 114B, respectively, plotted as a function of beam travel Z. FIG. 7D shows the elongation ratio vs. distance (z) characteristics of the laser scanning beam of the present disclosure. Notably, at any point Z along laser beam travel, where the Y and X cross-sectional dimensions are equal, the cross-section of the laser beam is circular at that point (i.e. ER=Y/X=1). In order to achieve an ER greater than 4.5, the Y dimension of the laser beam must either diverge faster than the X dimension thereof, or the X dimension of the laser beam must focus to a waist before diverging. As shown in FIG. 7D, the ER vs. Z plot of the illustrative embodiment shown in FIGS. 3 through 7E, is a result of the X dimension of the extremely-elongated laser beam focusing to a waist before diverging, as shown in FIG. 7D, while the Y dimension is diverging as shown in FIG. 7C, thereby creating an ER peak at the X waist position shown in FIGS. 7D and 7E.

In general, system 100 supports a manually-triggered triggered mode of operation, and also an automatically-triggered mode of operation, described below.

In response to a triggering event (i.e. manually pulling trigger 104), the laser scanning module 105 generates and projects an extremely-elongated laser scanning beam 114B through the light transmission window 103, and across the laser scanning field 115 external to the hand-supportable housing, for scanning an object in the scanning field. The laser scanning beam is generated by the laser beam source 112 and optics 161, 163 and 164, in response control signals generated by the system controller 150. The scanning element (i.e. mechanism) 134 repeatedly scans the selected laser beam across a code symbol residing on an object in the near portion or far portion of the laser scanning field 115. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by an extremely-elongated laser scanning beam 114B. Symbol character data corresponding to the bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system 100.

In response to the automatic detection of an object in the laser scanning field 115, by IR-based object presence detection subsystem 225, the laser scanning module 105 generates and projects an extremely-elongated laser scanning beam 114B through the light transmission window 103, and across the laser scanning field 115 external to the hand-supportable housing, for scanning an object in the scanning field. The laser scanning beam 114B is generated by laser source 112 in response control signals generated by the system controller 150. The scanning element (i.e. mechanism) 134 repeatedly scans the laser beam 114B across the scanning field 115 containing a bar code symbol 116. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by extremely-elongated laser scanning beam 114B. Symbol character data corresponding to the bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system 100.

Referring to FIG. 8, the method of reading bar code symbols and controlling operations within the laser scanning bar code reader 100, will be described in greater detail below.

As indicated in FIG. 8, the process orchestrated by system controller 150 begins at the START Block, where all system components are activated. As indicated at Block A1 in FIG. 8, the system controller 150 continues to determine when an object has been detected anywhere in the field of view (FOV), and when this event occurs, the system controller determines at Block A2 whether or not the IR-based object detection subsystem 225 detects an object in the near portion of the scanning field 115. In the event an object has been detected in the near portion of the scanning field, then at Block B, the system controller directs the laser scanning module 105 to scan the detected object with an extremely-elongated laser beam 114B generated by the VLD 112 and associated yoke assembly 155 shown in FIGS. 5A through 5D, or 155' shown in FIG. 6.

At Block C, the decode processor 108 runs a decode algorithm on the captured scan data, and if at Block D, a bar code symbol is decoded, then at Block E, the produced symbol character data is transmitted to the host system, and the system controller returns to Block A1. If, however, at Block D a bar code symbol is not decoded, then the system controller 150 determines at Block F1 whether or not the maximum scan attempt threshold has been reached, and if not, then the system controller 150 returns to Block B, and resumes the flow as indicated. However, if at Block F1, the system controller 150 determines that the maximum scan attempt threshold has been accomplished, then optionally, the system controller 150 proceeds to Block F2 and sends a Failure to Decode notification to the operator and returns to Block A1.

If at Block A2, an object is not detected in the near portion of the laser scanning field 115, then at Block G in FIG. 8, the system controller directs the laser scanning module 105 to scan the detected object with an extremely-elongated laser beam generated 114B by the VLD 112 and associated yoke assembly 155 shown in FIGS. 5A through 5D, or 155' shown in FIG. 6. Then at Block H, one or more decode algorithms are run on the collected scan data, and at Block I, the system controller 150 determines whether or not a bar code symbol is decoded by decode processor 108. If at Block I a bar code symbol is decoded, then at Block J the produced symbol character data produced is transmitted to the host system, and system control returns to Block A1, as shown in FIG. 8. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 8. When the maximum number of attempts to decode has been reached at Block K, then optionally, system controller 150 sends a Failure to Decode notification to the operator, and the system returns to Block A1, as shown in FIG. 8.

Performance of an Extremely-Elongated Laser Scanning Beam Used to Scan Various Types of 1D and 2D Stacked Bar Code Symbols The structure and operation of the laser scanning bar code symbol reading system 100 of the illustrative embodiment has been described above. The novel elongation ratio (ER) characteristics of extremely elongated laser scanning beam 114B have been shown in FIG. 7D, and its beam waist characteristics have been shown in FIG. 7E. It is appropriate at this juncture to describe the performance of the extremely-elongated laser scanning beam 114B, when scanning various types of 1D and 2D stacked bar code symbologies.

Figure 9A:
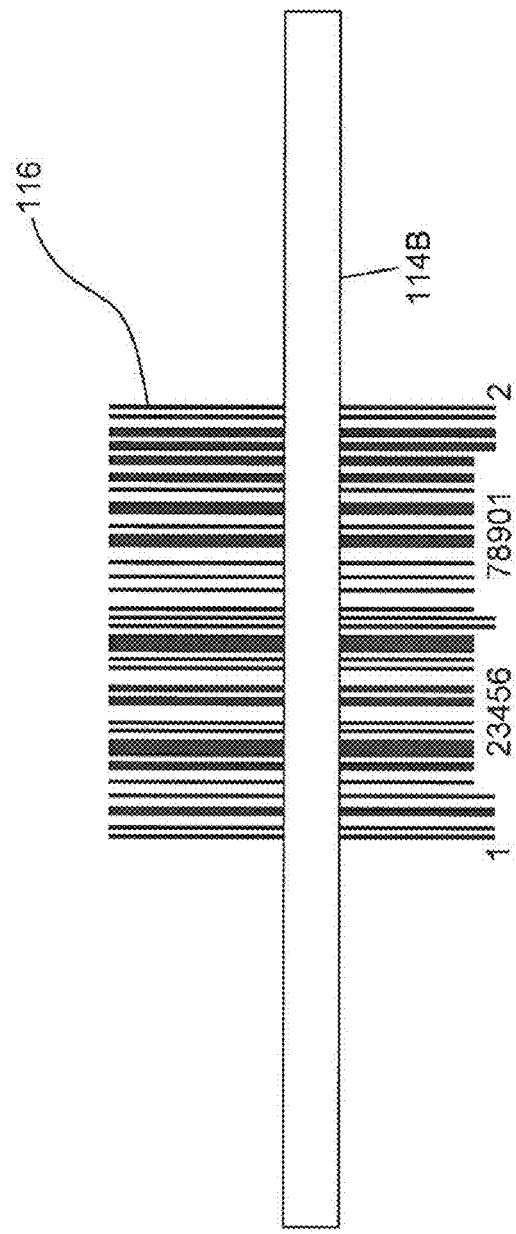
FIG. 9A is a graphical representation of a perfect UPC bar code symbol being scanned by an extremely-elongated laser scanning beam produced from the hand-supportable laser scanning bar code symbol reader of FIG. 3.
Figure 9B:
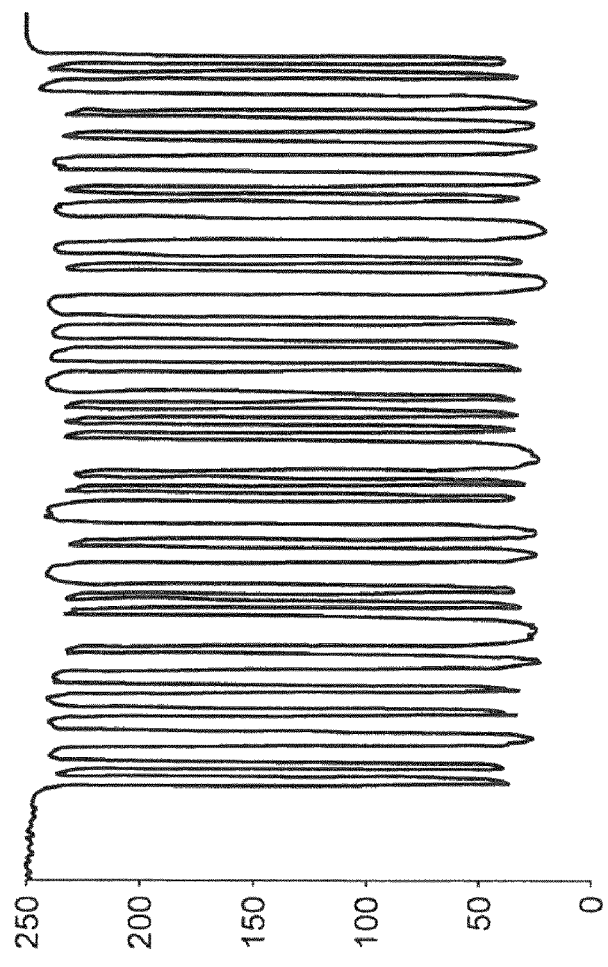
FIG. 9B is a graphical representation of the reflectance profile produced by a extremely-elongated (E2) laser scanning beam projected from the hand-supportable laser scanning bar code symbol reader of FIG. 3, when used to scan the perfect UPC bar code symbol shown in FIG. 9A.

FIG. 9A shows a perfect UPC bar code symbol being scanned by the extremely-elongated laser scanning beam 114B produced from the laser scanning bar code symbol reader of FIG. 3. FIG. 9B shows the reflectance intensity profile produced by the extremely-elongated (E2) laser scanning beam 114B projected from the laser scanning bar code symbol reader of FIG. 3, when used to scan the perfect UPC bar code symbol 116 shown in FIG. 9A.

Figure 10A:
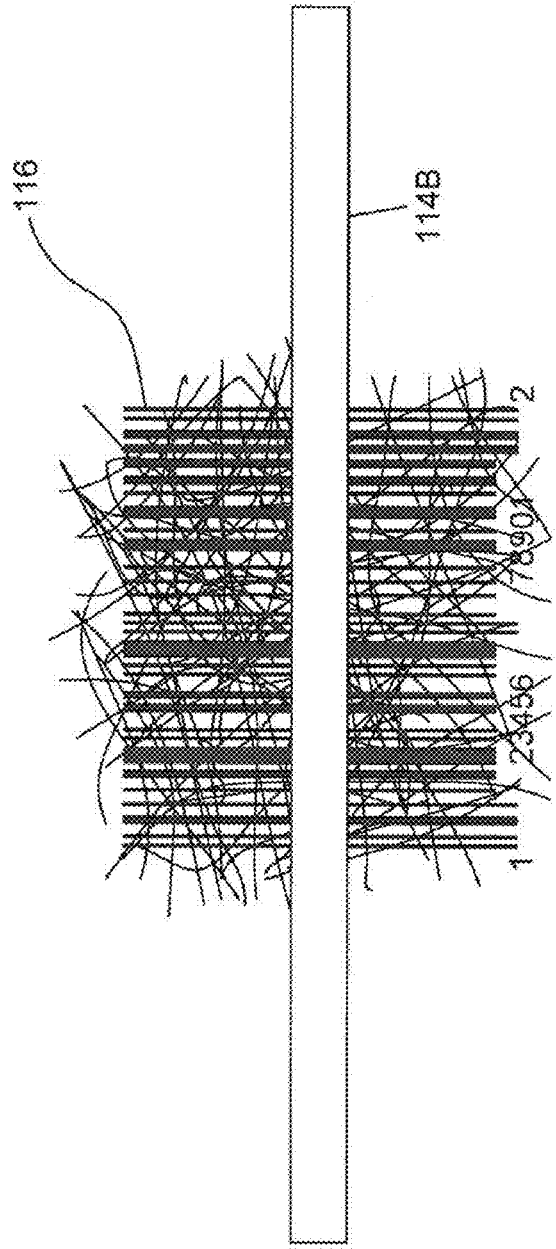
FIG. 10A is a graphical representation of a degraded UPC bar code symbol being scanned by an extremely-elongated laser scanning beam produced from the hand-supportable laser scanning bar code symbol reader of FIG. 3.
Figure 10B:
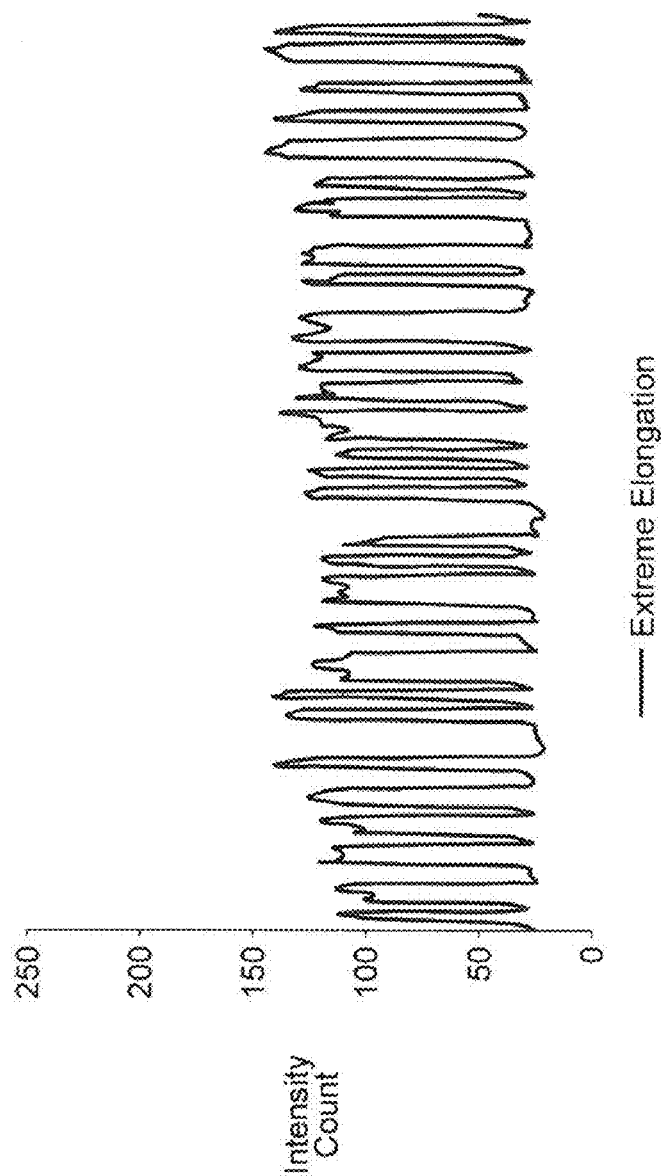
FIG. 10B is a graphical representation of the reflectance profile produced by a extremely-elongated (E2) laser scanning beam projected from the hand-supportable laser scanning bar code symbol reader of FIG. 3, when used to scan the degraded UPC bar code symbol shown in FIG. 10A.

FIG. 10A shows a degraded UPC bar code symbol being scanned by the extremely-elongated laser scanning beam 114B produced from the laser scanning bar code symbol reader of FIG. 3. FIG. 10B shows the reflectance intensity profile produced by the extremely-elongated (E2) laser scanning beam 114B projected from the laser scanning bar code symbol reader of FIG. 3, when used to scan the degraded UPC bar code symbol 116 shown in FIG. 10A.

Figure 11A:
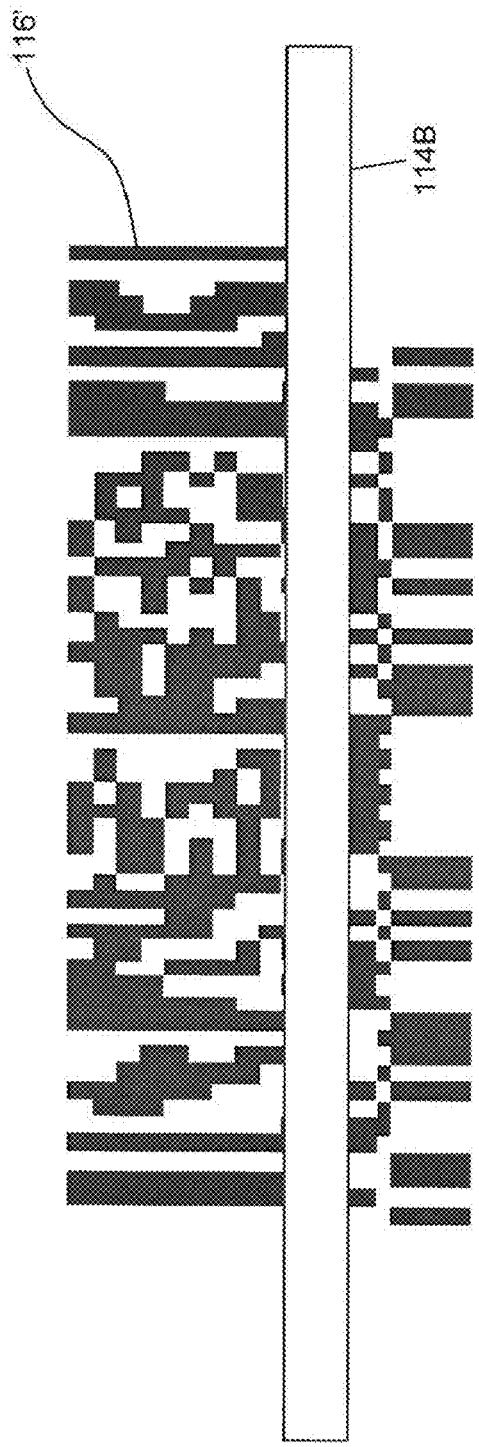
FIG. 11A is a graphical representation of the second layer of a good quality stacked 2D bar code symbol being scanned by an extremely-elongated laser scanning beam produced from the hand-supportable laser scanning bar code symbol reader of FIG. 3, where the height (y) dimension of the extremely-elongated laser beam on the scanning plane is greater than the height dimension of the bar elements in the second layer of the 2D stacked bar code symbol.
Figure 11B:
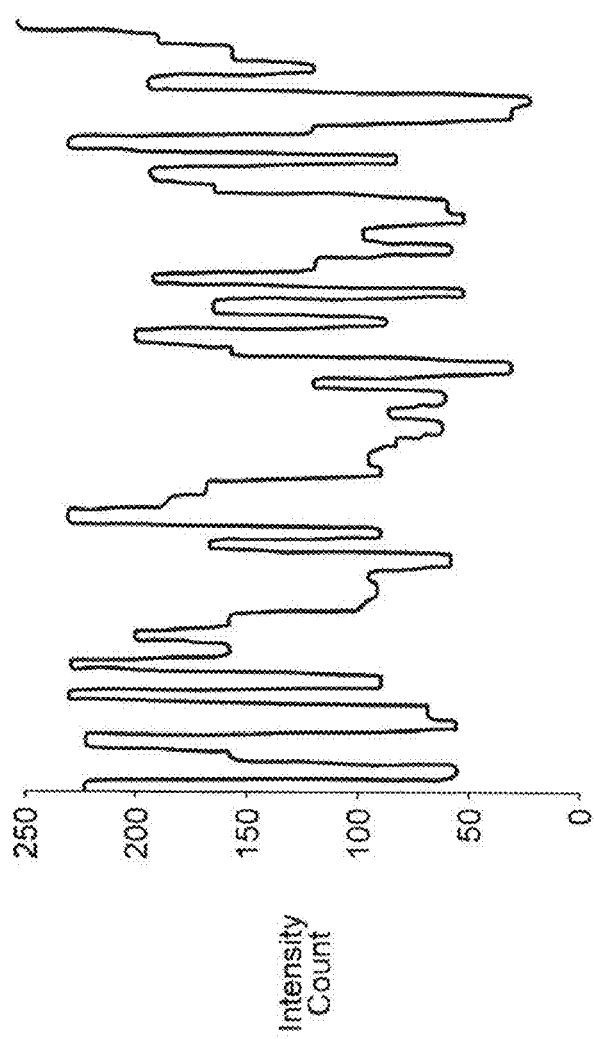
FIG. 11B is a graphical representation of the reflectance profile produced by a extremely-elongated laser scanning beam projected from the hand-supportable laser scanning bar code symbol reader of FIG. 3, when used to scan the stacked 2D bar code symbol shown in FIG. 11A.
Figure 12:
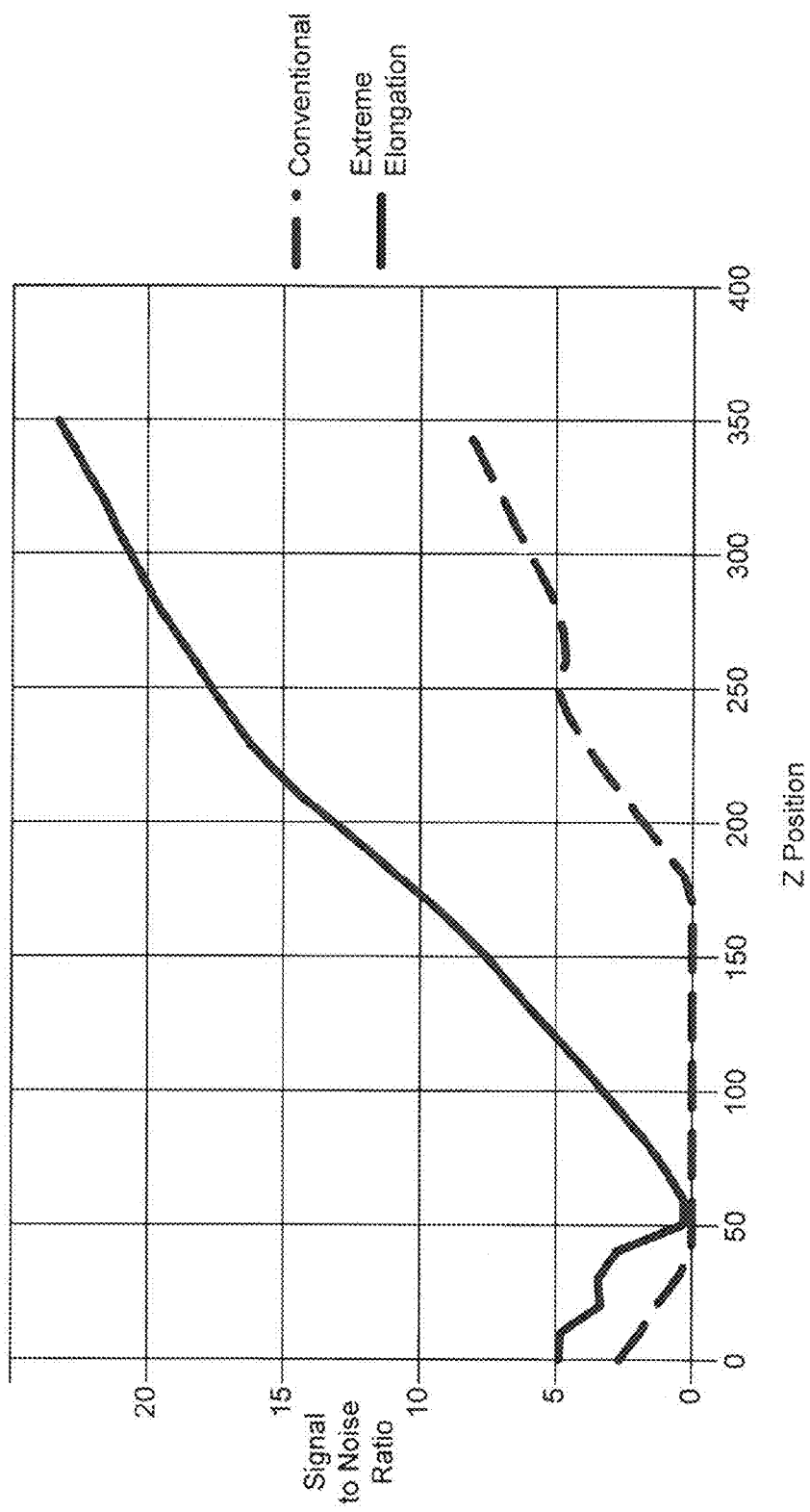
FIG. 12 is a graphical representation showing the signal to noise ratio (SNR) measures of conventionally and extremely elongated laser beams, scanning a bar code symbol having a reference defect with a surface area of 0.25 [mm$^2$], and detecting reflected light intensity at the light detector employed in the laser scanning bar code symbol reading systems shown in FIGS. 1 and 3, respectively, under performance comparison.

FIG. 11A shows the second layer of a perfect or good quality stacked 2D bar code symbol 113 being scanned by the extremely-elongated laser scanning beam produced from the laser scanning bar code symbol reader of FIG. 3. FIG. 11B shows the reflectance intensity profile produced by the extremely-elongated laser scanning beam projected from the laser scanning bar code symbol reader of FIG. 3, when used to scan the stacked 2D bar code symbol shown in FIG. 11A.

In each bar code scanning example described above, the reflection intensity characteristics of the extremely-elongated laser beam 114B having an elongation greater than 4.5 are substantially greater than the reflection intensity characteristics of a conventionally-elongated laser beam 10 having an elongation ratio less than 4.5. Such improvements in reflection intensity characteristics has a significant improvement in the signal to noise (SNR) performance of bar code symbol reading systems employing such extremely-elongated laser scanning beams. As shown in FIG. 13, SNR measures are plotted for conventionally-elongated laser beams having elongation ratios less than 4.5, and extremely-elongated laser beams having elongation ratios greater than 4.5, when scanning a test bar code symbol having a reference defect with a surface area of 0.25 [mm²]. Clearly, the extremely-elongated laser beam 114B generated from system 100 in FIG. 3 has a significantly improved SNR over the conventionally-generated laser beam 10 generated from system 1 in FIG. 1, at all positions the working distance of the laser scanning beam (i.e. Z axis) shown in FIG. 7.

However, with this improvement in SNR performance associated with the use of extremely-elongated laser scanning beams, there is a significant reduction in performance with roll performance. When using a conventionally-elongated laser beam 10 as shown in FIG. 1 where ER<4.5, the user must align the laser beam to the bar code symbol elements to within 15°. In contrast, when using an extremely-elongated laser beam profile where ER>4.5, the user must align the laser beam to the bar code symbol elements to within 5° to ensure the laser scanning beam crosses the entire bar code symbol. Thus, when using an extremely-elongated laser beam profile, user swill intuitively align the laser scanning pattern to a lower roll angle than that of the conventional laser scanning pattern.

Some Modifications which Readily Come to Mind

While the illustrative embodiments disclosed the use of a 1D laser scanning beams to detect bar code symbols on objects, it is understood that a 2D or raster-type laser scanning beam (patterns), using extremely-elongated laser beams, can be used as well, to scan 1D bar code symbols, 2D stacked linear bar code symbols, and 2D matrix code symbols, and generate scan data signals for decoding processing.

Also, the illustrative embodiment have been described in connection with various types of code symbol reading applications involving 1-D and 2-D bar code structures (e.g. 1D bar code symbols, 2D stacked linear bar code symbols, and 2D matrix code symbols). Hereinafter, the term "code symbol" shall be deemed to include all such code symbols.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A laser scanning bar code symbol reading system for scanning and reading poor quality or damaged bar code symbols, said laser scanning bar code symbol reading system having a working range and comprising:
   a housing having a light transmission window;
   an extremely-elongated laser beam production module for producing an extremely-elongated laser beam having (i) a direction of propagation extending along a z reference direction, (ii) a height dimension being indicated by the y reference direction, and (iii) a width dimension being indicated by the x reference direction, where x, y and z reference directions are orthogonal to each other;
   wherein said extremely-elongated laser beam is characterized by an elongation ratio (ER) that is defined as Y/X>4.5 for any point within said working range of said laser scanning bar code symbol reading system, extending along said z reference direction;
   where (i) Y indicates the beam height of said extremely-elongated laser beam measured in said y reference direction, and X indicates the beam width of said extremely-elongated laser beam measured in the x reference direction, and (iii) beam height (Y) and said laser beam width (X) are measured at $1/e^2$ intensity clip level,
   wherein said elongation ratio (ER) is greater than 4.5 over the entire working range of said laser scanning bar code symbol reading system, along said z reference direction, and
   wherein said elongation ratio (ER) has a maximum value greater than 9.0 at or near the waist portion of said extremely-elongated laser beam, occurring within the working distance of said laser scanning bar code symbol reading system, so as to help optimize the reading of bar code symbols when scanned by the waist portion of said extremely-elongated laser beam; and
   a laser scanning mechanism for scanning said extremely-elongated laser beam out said light transmission window and across a scanning field defined external to said housing, in which a bar code symbol is present for scanning by said extremely-elongated laser scanning beam.

2. The laser scanning bar code symbol reading system of claim 1, wherein said bar code symbol is a code symbol selected from the group consisting of 1D bar code symbols, and 2D stacked bar code symbols.

3. The laser scanning bar code symbol reading system of claim 1, wherein said extremely-elongated laser beam production module comprises a laser drive circuit for generating and delivering laser drive current signals to a laser source to produce said extremely-elongated laser scanning beam.

4. The laser scanning bar code symbol reading system of claim 3, which further comprises:
   light, collection optics for collecting light reflected/scattered from scanned object in the scanning field, and a photo-detector for detecting the intensity of collected light and generating an analog scan data signal corresponding to said detected light intensity during scanning operations;
   an analog scan data signal processor/digitizer for processing the analog scan data signals and converting the processed analog scan data signals into digital scan data signals, which are then converted into digital words representative of the relative width of the bars and spaces in the scanned code symbol structure;
   programmed decode processor for decode processing digitized data signals, and generating symbol character data representative of each bar code symbol scanned by said extremely-elongated laser scanning beam.

5. The laser scanning bar code symbol reading system of claim 4, which further
   an input/output (I/O) communication interface module for interfacing with a host communication system and transmitting symbol character data thereto via wired or wireless communication links that are supported by the symbol reader and host system; and
   a system controller for generating the necessary control signals for controlling operations within said laser scanning bar code symbol reading system.

6. The laser scanning bar code symbol reading system of claim 4, wherein said housing comprises a hand-supportable housing.

7. The laser scanning bar code symbol reading system of claim 4, wherein said laser source comprises a visible laser diode (VLD).

8. A laser scanning system for scanning poor quality or damaged bar code symbols, said laser scanning system having a working range and comprising:
   a housing having a light transmission window;
   an extremely-elongated laser beam production module for producing an extremely-elongated laser beam having (i)

a direction of propagation extending along a z reference direction, (ii) a height dimension being indicated by the y reference direction, and (iii) a width dimension being indicated by the x reference direction, where x, y and z reference directions are orthogonal to each other;

wherein said extremely-elongated laser beam is characterized by an elongation ratio (ER) that is defined as Y/X>4.5 for any point within said working, range of said laser scanning bar code symbol reading system, extending along said z reference direction;

where (i) Y indicates the beam height of said extremely-elongated laser beam measured in said y reference direction, and X indicates the beam width of said extremely-elongated laser beam measured in the x reference direction, and (iii) said beam height (Y) and said laser beam width (X) are measured at $1/e^2$ intensity clip level;

wherein said elongation ratio (ER) is greater than 4.5 over the entire working range of said laser scanning bar code symbol reading system, along said z reference direction, and wherein said elongation ratio (ER) has a maximum value greater than 9.0 at or near the waist portion of said extremely-elongated laser beam, occurring within the working distance of said laser scanning bar code symbol reading system, so as to help optimize the reading of bar code symbols when scanned by the waist portion of said extremely-elongated laser beam; and a laser scanning mechanism for scanning said extremely-elongated laser beam out said light transmission window and across a scanning field defined external to said housing, in which a bar code symbol is present for scanning by said extremely-elongated laser scanning beam.

9. The laser scanning system of claim 8, wherein said bar code symbol is a code symbol selected from the group consisting of 1D bar code symbols, and 2D stacked bar code symbols.

10. The laser scanning system of claim 8, wherein said extremely-elongated laser beam production module comprises a laser drive circuit for generating and delivering laser (diode) drive current signals to a laser source to produce said extremely-elongated laser scanning beam.

11. The laser scanning system of claim 10, wherein said laser source comprises a visible laser diode (VLD).

12. The laser scanning system of claim 8, which further comprises:
light collection optics for collecting light reflected/scattered from scanned object in the scanning field, and a photo-detector for detecting the intensity of collected light and generating an analog scan data signal corresponding to said detected light intensity during seaming operations;
an analog, scan data signal processor/digitizer for processing the analog scan data signals and converting, the processed analog scan data signals into digital scan data signals, which are then converted into digital words representative of the relative width of the bars and spaces in the scanned bar code symbol;
programmed decode processor for decode processing digitized data signals, and generating symbol character data representative of each bar code symbol scanned by said extremely-elongated laser scanning beam.

13. The laser scanning system of claim 8, wherein said housing comprises a hand-supportable housing.

14. A method of laser scanning a bar code symbol comprising the steps:
(a) producing from a hand-supportable housing, an extremely-elongated laser beam having (i) a direction of propagation extending along a z reference direction, (ii) a height dimension being indicated by the y reference direction, and (iii) a width dimension being indicated by the x reference direction, where x, y and z reference directions are orthogonal to each other;
wherein said extremely-elongated laser beam is characterized by an elongation ratio (ER) that is defined as Y/X>4.5 for any point within said working range of said laser scanning bar code symbol reading system, extending along said z reference direction;
where (i) Y indicates the beam height of said extremely-elongated laser beam measured in said y reference direction, and X indicates the beam width of said extremely-elongated laser beam measured in the x reference direction, and (iii) said beam height (Y) and said laser beam width (X) are measured at $1/e^2$ intensity clip level; and
(b) scanning said extremely-elongated laser beam across a scanning field defined external to said hand-supportable housing, in which a bar code symbol is present for scanning by said extremely-elongated laser scanning beam;
wherein said elongation ratio (ER) is greater than 4.5 over the entire working range of said laser scanning bar code symbol reading system, along said z reference direction, and
wherein said elongation ratio (ER) has a maximum value greater than 9.0 at or near the waist portion of said extremely-elongated laser beam, occurring within the working distance of said laser scanning bar code symbol reading system, so as to help optimize the reading of bar code symbols when scanned by the waist portion of said extremely-elongated laser beam.

15. The method of claim 14, which further comprises:
(c) collecting light reflected/scattered from scanned bar code symbol in said scanning field, and detecting the intensity of said collected light and generating an analog scan data signal corresponding to said detected light intensity during scanning operations;
(d) processing said analog scan data signals and converting the processed analog scan data signals into digital scan data signals, and then converted said digital scan data signals into digital words representative of the relative width of the bars and spaces in the scanned bar code symbol; and
(e) decode processing digitized scan data signals, and generating symbol character data representative of each bar code symbol scanned by said extremely-elongated laser scanning beam.

16. The method of claim 14, wherein said bar code symbol is a code symbol selected from the group consisting of 1D bar code symbols, and 2D stacked bar code symbols.

* * * * *